United States Patent
Lawlor

(10) Patent No.: US 11,893,796 B2
(45) Date of Patent: *Feb. 6, 2024

(54) METHODS AND SYSTEMS FOR DETECTION OF ANOMALOUS MOTION IN A VIDEO STREAM AND FOR CREATING A VIDEO SUMMARY

(71) Applicant: GENETEC INC., Saint-Laurent (CA)

(72) Inventor: Sean Lawlor, Dollard-des-Ormeaux (CA)

(73) Assignee: GENETEC INC., St-Laurent (CA)

( * ) Notice: Subject to any disclaimer, the term of this patent is extended or adjusted under 35 U.S.C. 154(b) by 106 days.

This patent is subject to a terminal disclaimer.

(21) Appl. No.: 17/183,427

(22) Filed: Feb. 24, 2021

(65) Prior Publication Data
US 2021/0225409 A1 Jul. 22, 2021

Related U.S. Application Data

(63) Continuation of application No. 16/677,330, filed on Nov. 7, 2019, now Pat. No. 10,971,192.
(Continued)

(51) Int. Cl.
*G06V 20/52* (2022.01)
*G06V 20/40* (2022.01)
(Continued)

(52) U.S. Cl.
CPC ............. *G06V 20/52* (2022.01); *G06F 18/10* (2023.01); *G06V 10/764* (2022.01); *G06V 20/40* (2022.01);
(Continued)

(58) Field of Classification Search
CPC .... G11B 27/34; G11B 27/3081; G06V 20/40; G06V 20/44; G06K 9/6298; G08B 17/125
See application file for complete search history.

(56) References Cited

U.S. PATENT DOCUMENTS 4,652,907 A  3/1987 Fling
4,979,036 A  12/1990 Smith
(Continued)

FOREIGN PATENT DOCUMENTS

JP  2005094245  4/2005
WO  2001061993  8/2001
(Continued)

OTHER PUBLICATIONS

Fathy, M. and Siyal, Y. A window based image processing technique for quantitative and qualitative analysis of road traffic parameters, IEEE Transactions on Vehicular Technology, 1998, pp. 1342-1349.
(Continued)

*Primary Examiner* — Thai Q Tran
*Assistant Examiner* — Jose M Mesa

(57) ABSTRACT

A computer-implemented method, comprising: obtaining motion indicators for a plurality of samples of a video stream; obtaining an anomaly state for each of a plurality of time windows of the video stream, each of the time windows spanning a subset of the samples, by (i) obtaining estimated statistical parameters for the given time window based on measured statistical parameters characterizing the motion indicators for the samples in at least one time window of the video stream that precedes the given time window and (ii) determining the anomaly state for the given time window based on the plurality of motion indicators obtained for the samples in the given time window and the estimated statistical parameters; and processing the video stream based on the anomaly state for various ones of the time windows.

58 Claims, 18 Drawing Sheets

Related U.S. Application Data

(60) Provisional application No. 62/928,531, filed on Oct. 31, 2019, provisional application No. 62/796,734, filed on Jan. 25, 2019, provisional application No. 62/756,645, filed on Nov. 7, 2018.

(51) Int. Cl.
*G06V 10/764* (2022.01)
*G11B 27/34* (2006.01)
*G06F 18/10* (2023.01)
*G11B 27/30* (2006.01)
*G08B 17/12* (2006.01)

(52) U.S. Cl.
CPC .......... *G06V 20/47* (2022.01); *G11B 27/3081* (2013.01); *G11B 27/34* (2013.01); *G06V 20/44* (2022.01); *G08B 17/125* (2013.01)

(56) References Cited

U.S. PATENT DOCUMENTS

| | | | |
|---|---|---|---|
| 6,493,041 B1 | 12/2002 | Hanko | |
| 7,075,581 B1 | 7/2006 | Ozgen | |
| 7,286,709 B2 | 10/2007 | Wakabayashi | |
| 7,324,163 B2 | 1/2008 | Bacche | |
| 7,535,515 B2 | 5/2009 | Bacche | |
| 7,836,476 B2 * | 11/2010 | Yoshikawa | G11B 27/105 725/115 |
| 7,925,106 B2 | 4/2011 | Seo | |
| 8,102,406 B2 | 1/2012 | Peleg | |
| 8,189,869 B2 | 5/2012 | Bell | |
| 8,275,038 B2 | 9/2012 | Lee | |
| 8,345,761 B2 | 1/2013 | Sakamoto | |
| 8,437,505 B2 | 5/2013 | Flosdorf | |
| 8,553,783 B2 | 10/2013 | Deng | |
| 9,158,974 B1 | 10/2015 | Laska et al. | |
| 9,160,897 B2 | 10/2015 | Albu | |
| 9,460,522 B2 | 10/2016 | Saitwal | |
| 9,473,746 B2 | 10/2016 | Masuura | |
| 9,502,073 B2 | 11/2016 | Boiman | |
| 9,615,087 B2 * | 4/2017 | Amon | H04N 19/87 |
| 9,779,303 B2 | 10/2017 | Zhang | |
| 10,403,326 B1 * | 9/2019 | Médioni | G11B 27/031 |
| 2004/0088723 A1 | 5/2004 | Ma | |
| 2006/0109341 A1 | 5/2006 | Evans | |
| 2009/0142033 A1 * | 6/2009 | Schmouker | H04N 5/76 386/343 |
| 2010/0281383 A1 * | 11/2010 | Meaney | G11B 27/34 715/723 |
| 2012/0063641 A1 | 3/2012 | Venkatesh | |
| 2012/0189284 A1 | 7/2012 | Morrison | |
| 2012/0323925 A1 | 12/2012 | Fitzsimmons et al. | |
| 2014/0350436 A1 | 11/2014 | Nathan | |
| 2014/0355895 A1 * | 12/2014 | Xu | G06K 9/6298 382/228 |
| 2016/0042621 A1 | 2/2016 | Hogg et al. | |
| 2016/0299968 A1 * | 10/2016 | Song | G06F 16/38 |
| 2017/0111674 A1 * | 4/2017 | Meredith | H04N 21/47202 |
| 2017/0374120 A1 * | 12/2017 | Vishnia | H04L 65/75 |
| 2020/0019790 A1 * | 1/2020 | Periaswamy | G06V 10/42 |
| 2020/0143844 A1 | 5/2020 | Lawlor | |

FOREIGN PATENT DOCUMENTS

| | | |
|---|---|---|
| WO | 2018176162 | 10/2018 |
| WO | 2020093164 | 5/2020 |

OTHER PUBLICATIONS

Jing G, Rajan D and Chng Eng Siong, Motion detection with adaptive background and dynamic thresholds, Information, Communications and Signal Processing, 2005, Fifth International Conference on. IEEE.

Quen-Zong Wu, Hsu Yung Cheng and Bor-Shenn Jeng, Motion detection via change-point detection for cumulative histograms of ratio images, Pattern Recognition Letters 26.5 ,2005, pp. 555-563.

Elhabian, El Sayed and Ahmed, Moving object detection in spatial domain using background removal techniques—state-of-art, Recent patents on computer science 1.1, 2008, pp. 32-54.

Dimou, Nemethova and Rupp, Scene change detection for H. 264 using dynamic threshold techniques, http://citeseerx.ist.psu.edu/viewdoc/download?doi=10.1.1.92.9213&rep=rep1&type=pdf, 2005.

Zhang and Liang, Motion human detection based on background subtraction, Education Technology and Computer Science (ETCS), 2010 Second International Workshop on. vol. 1. IEEE, 2010.

Browne et al., Evaluating and combining digital video shot boundary detection algorithms, http://doras.dcu.ie/336/1/imvip_2000.pdf, 2000.

Intelligent Video Analytics Solutions—BriefCam, https://www.briefcam.com/technology/how-it-works/, 8 pages, [retrieved on Nov. 7, 2019].

Wisenet Wave—VMS Made Simple, https://wavevms.com/, 8 pages [retrieved on Nov. 7, 2019].

Fast Finder—Apps on Google Play, 2019, 4 pages.

International Search Report and Writen Opinion dated Feb. 5, 2020, in connection with PCT CA2019/051588, 12 pages.

Office Action dated Aug. 21, 2020 in connection with U.S. Appl. No. 16/677,330, 49 pages.

* cited by examiner

METHODS AND SYSTEMS FOR DETECTION OF ANOMALOUS MOTION IN A VIDEO STREAM AND FOR CREATING A VIDEO SUMMARY

CROSS-REFERENCE TO RELATED APPLICATIONS

The present application claims the benefit of U.S. Non-Provisional patent application Ser. No. 16/677,330, filed Nov. 7, 2019; U.S. Provisional Patent Application Ser. No. 62/756,645, filed Nov. 7, 2018; U.S. Provisional Patent Application Ser. No. 62/796,734, filed Jan. 25, 2019; and U.S. Provisional Patent Application Ser. No. 62/928,531, filed Oct. 31, 2019; all of the aforementioned applications are hereby incorporated by reference herein.

FIELD

The present disclosure relates generally to video processing and, more particularly, to methods and systems for detection of anomalous motion in a video stream and for creating a video summary from one or more video streams.

BACKGROUND

A video stream often contains some image data of greater importance and other image data of lesser importance to its viewer. This is especially true in the case of security cameras, which contain image data of lesser interest to the viewer for the vast majority of their "on" time. Reviewing live or recorded footage from one or multiple cameras can therefore be a tedious process, which may result in errors if the viewer loses concentration. A system that could assist the viewer in effectively gaining access to more relevant video footage would be welcomed by the industry.

SUMMARY

According to a broad aspect of the disclosure, there is provided a computer-implemented method, comprising:
  obtaining motion indicators for a plurality of samples of a video stream;
  obtaining an anomaly state for each of a plurality of time windows of the video stream, each of the time windows spanning a subset of the samples, by:
    obtaining estimated statistical parameters for the given time window based on measured statistical parameters characterizing the motion indicators for the samples in at least one time window of the video stream that precedes the given time window; and
    determining the anomaly state for the given time window based on the plurality of motion indicators obtained for the samples in the given time window and the estimated statistical parameters; and
  processing the video stream based on the anomaly state for various ones of the time windows.

According to another broad aspect of the disclosure, there is provided a non-transitory computer-readable medium comprising computer-readable instructions which, when executed by a computing device, configure the computing device to carry out a method that includes:
  obtaining motion indicators for a plurality of samples of a video stream;
  obtaining an anomaly state for each of a plurality of time windows of the video stream, each of the time windows spanning a subset of the samples, by:
    obtaining estimated statistical parameters for the given time window based on measured statistical parameters characterizing the motion indicators for the samples in at least one time window of the video stream that precedes the given time window; and
    determining the anomaly state for the given time window based on the plurality of motion indicators obtained for the samples in the given time window and the estimated statistical parameters; and
  processing the video stream based on the anomaly state for various ones of the time windows.

According to another broad aspect of the disclosure, there is provided a video management system, comprising:
  a memory storing computer-readable instructions;
  an input/output interface; and
  a processor operatively coupled to the memory and to the input/output interface and configured for executing the computer-readable instructions stored in the memory to carry out a method that comprises:
    obtaining a video stream from the input/output interface or the memory;
    obtaining motion indicators for a plurality of samples of the video stream;
    obtaining an anomaly state for a given time window of a plurality of time windows of the video stream, each of the time windows spanning a subset of the samples, by:
      obtaining estimated statistical parameters for the given time window based on measured statistical parameters characterizing the motion indicators for the samples in at least one time window of the video stream that precedes the given time window; and
      determining the anomaly state for the given time window based on the plurality of motion indicators obtained for the samples in the given time window and the estimated statistical parameters; and
    processing the video stream based on the anomaly state for various ones of the time windows;
    outputting a result of the processing to the input/output interface or to the memory.

According to another broad aspect of the disclosure, there is provided a computer-implemented method, comprising:
  receiving a plurality of video streams from a plurality of cameras;
  obtaining an anomaly state associated with each of the video streams, the anomaly state indicating whether an associated portion of the respective video stream exhibits a statistically abnormal change in motion; and
  displaying a subset of the video streams on an output device as a function of the anomaly state associated with each of the video streams.

According to another broad aspect of the disclosure, there is provided a non-transitory computer-readable medium comprising computer-readable instructions which, when executed by a computing device, configure the computing device to carry out a method that includes:
  receiving a plurality of video streams from a plurality of cameras;
  obtaining an anomaly state associated with each of the video streams, the anomaly state indicating whether an associated portion of the respective video stream exhibits a statistically abnormal change in motion; and
  displaying a subset of the video streams on an output device as a function of the anomaly state associated with each of the video streams.

According to another broad aspect of the disclosure, there is provided a video management system, comprising:
a memory storing computer-readable instructions;
an input/output interface; and
a processor operatively coupled to the memory and to the input/output interface and configured for executing the computer-readable instructions stored in the memory to carry out a method that comprises:
obtaining at least one media stream from the input/output interface or the memory;
determining an anomaly state associated with each of the at least one media stream;
identifying segments of interest of each of the at least one media stream based on the anomaly state associated with each of the at least one media stream; and
creating a media summary based on the identified segments of interest of the at least one media stream.
outputting the media summary to the input/output interface or to the memory.

According to another broad aspect of the disclosure, there is provided a computer-implemented media processing method, comprising:
obtaining at least one media stream divided into time windows;
determining an anomaly state of each time window of each of the at least one media stream;
identifying subsets of each of the at least one media stream based on the anomaly state of each time window of each of the at least one media stream; and
creating a media summary based on the identified subsets of the at least one media stream.

According to another broad aspect of the disclosure, there is provided a non-transitory computer-readable medium comprising computer-readable instructions which, when executed by a computing device, configure the computing device to carry out a method that includes:
obtaining at least one media stream divided into time windows;
determining an anomaly state of each time window of each of the at least one media stream;
identifying subsets of each of the at least one media stream based on the anomaly state of each time window of each of the at least one media stream; and
creating a media summary based on the identified subsets of the at least one media stream.

According to another broad aspect of the disclosure, there is provided a video management system, comprising:
a memory storing computer-readable instructions;
an input/output interface; and
a processor operatively coupled to the memory and to the input/output interface and configured for executing the computer-readable instructions stored in the memory to carry out a method that comprises:
obtaining a plurality of video streams associated with a plurality of cameras;
determining an anomaly state associated with each of the video streams;
obtaining one or more criteria;
identifying occurrences in each video stream, said occurrences being indicative of the one or more criteria being met by the anomaly state; and
taking an action involving said occurrences.

According to another broad aspect of the disclosure, there is provided a computer-implemented media processing method, comprising:

obtaining a media stream;
for each portion of a plurality of portions of the media stream, determining a state associated with that portion, the state being one of a plurality of possible states;
obtaining input from a user that identifies one or more criteria;
processing at least the state associated with each portion of the media stream to identify a subset of portions of the plurality of portions of the media stream that meet the one or more criteria; and
creating a media summary based on the identified subset of portions.

According to another broad aspect of the disclosure, there is provided a non-transitory computer-readable medium comprising computer-readable instructions which, when executed by a computing device, configure the computing device to carry out a method that includes:
obtaining an original media stream;
for each of a plurality of portions of the media stream, determining an anomaly state associated with that portion, the anomaly state being one of a plurality of possible anomaly states; and
storing a composite media stream in a memory, each of a plurality of portions of the composite media stream comprising a corresponding one of the portions of the original media stream and an indication of the anomaly state associated with the corresponding one of the portions of the original media stream.

According to another broad aspect of the disclosure, there is provided a video management system, comprising:
a memory storing computer-readable instructions;
an input/output interface; and
a processor operatively coupled to the memory and to the input/output interface and configured for executing the computer-readable instructions stored in the memory to carry out a method that comprises:
obtaining an original media stream;
for a given portion of a plurality of portions of the media stream, determining an anomaly state associated with the given portion, the anomaly state being one of a plurality of possible anomaly states; and
storing a composite media stream in a memory, each of a plurality of portions of the composite media stream comprising a corresponding one of the portions of the original media stream and an indication of the anomaly state associated with the corresponding one of the portions of the original media stream.

According to another broad aspect of the disclosure, there is provided a computer-implemented media processing method, comprising:
receiving a first plurality of media streams,
determining an anomaly state of each of the media streams;
selecting a second plurality of media streams from the first plurality of media streams based on (i) the anomaly state of each of the first plurality of media streams or (ii) transitions in the anomaly state of each of the first plurality of media streams; and
displaying the second plurality of media streams on a set of screens.

According to another broad aspect of the disclosure, there is provided a non-transitory computer-readable medium comprising computer-readable instructions which, when executed by a computing device, configure the computing device to carry out a method that includes:
receiving a first plurality of media streams,
determining an anomaly state of each of the media streams;

selecting a second plurality of media streams from the first plurality of media streams based on (i) the anomaly state of each of the first plurality of media streams or (ii) transitions in the anomaly state of each of the first plurality of media streams; and displaying the second plurality of media streams on a set of screens.

According to another broad aspect of the disclosure, there is provided a video management system, comprising:

a memory storing computer-readable instructions;

an input/output interface; and a processor operatively coupled to the memory and to the input/output interface and configured for executing the computer-readable instructions stored in the memory to carry out a method that comprises:

receiving a first plurality of media streams, determining an anomaly state of each of the media streams;

selecting a second plurality of media streams from the first plurality of media streams based on (i) the anomaly state of each of the first plurality of media streams or (ii) transitions in the anomaly state of each of the first plurality of media streams; and displaying the second plurality of media streams on a set of screens.

According to another broad aspect of the disclosure, there is provided a media processing method implemented by a computer, comprising:

obtaining a media stream;

obtaining a target characteristic;

obtaining one or more criteria;

creating a media summary based on subsets of the media stream that meet the one or more criteria; and adapting the one or more criteria based on whether the media summary satisfies the target characteristic.

According to another broad aspect of the disclosure, there is provided a non-transitory computer-readable medium comprising computer-readable instructions which, when executed by a computing device, configure the computing device to carry out a method that includes:

obtaining a media stream;

obtaining a target characteristic;

obtaining one or more criteria;

creating a media summary based on subsets of the media stream that meet the one or more criteria; and adapting the one or more criteria based on whether the media summary satisfies the target characteristic.

According to another broad aspect of the disclosure, there is provided a video management system, comprising:

a memory storing computer-readable instructions;

an input/output interface; and a processor operatively coupled to the memory and to the input/output interface and configured for executing the computer-readable instructions stored in the memory to carry out a method that comprises:

obtaining a media stream;

obtaining a target characteristic;

obtaining one or more criteria;

creating a media summary based on subsets of the media stream that meet the one or more criteria; and adapting the one or more criteria based on whether the media summary satisfies the target characteristic.

According to another broad aspect of the disclosure, there is provided a computer-implemented media processing method, comprising:

in an original state, displaying a map and a display window, the map corresponding to locations of a plurality of cameras and the display window displaying video feeds corresponding to video data sent by the cameras;

in response to a selection of a subset of said plurality of cameras, referred to as active cameras, displaying on the display window video feeds corresponding to video data sent by the active cameras, and creating summaries of the video data sent by the cameras in the plurality of cameras that are not the active cameras, referred to as passive cameras, in response to a request to return to the original state, playing back on the display window the summaries to catch up to present time; and returning to the original state after the summaries have caught up to present time.

According to another broad aspect of the disclosure, there is provided a non-transitory computer-readable medium comprising computer-readable instructions which, when executed by a computing device, configure the computing device to carry out a method that includes:

in an original state, displaying a map and a display window, the map corresponding to locations of a plurality of cameras and the display window displaying video feeds corresponding to video data sent by the cameras;

in response to a selection of a subset of said plurality of cameras, referred to as active cameras, displaying on the display window video feeds corresponding to video data sent by the active cameras, and creating summaries of the video data sent by the cameras in the plurality of cameras that are not the active cameras, referred to as passive cameras, in response to a request to return to the original state, playing back on the display window the summaries to catch up to present time; and returning to the original state after the summaries have caught up to present time.

According to another broad aspect of the disclosure, there is provided a video management system, comprising:

a memory storing computer-readable instructions;

an input/output interface; and a processor operatively coupled to the memory and to the input/output interface and configured for executing the computer-readable instructions stored in the memory to carry out a method that comprises:

in an original state, displaying a map and a display window, the map corresponding to locations of a plurality of cameras and the display window displaying video feeds corresponding to video data sent by the cameras;

in response to a selection of a subset of said plurality of cameras, referred to as active cameras, displaying on the display window video feeds corresponding to video data sent by the active cameras, and creating summaries of the video data sent by the cameras in the plurality of cameras that are not the active cameras, referred to as passive cameras, in response to a request to return to the original state, playing back on the display window the summaries to catch up to present time; and returning to the original state after the summaries have caught up to present time.

According to another broad aspect of the disclosure, there is provided a system, comprising:

an input for receiving a video stream;

an output for releasing an output stream; and a processor for producing the output stream from the video stream;

wherein the processor is configured such that when the video stream is characterized by a sequence of oscillating frames having a % motion change of M from one frame to the next for a non-zero value of M that is less than 100%, the output stream is characterized by first change in output value that lasts for a certain number of oscillating frames in the video stream followed by a second change in output value to a second value, which from that point on ceases to change while the video stream continues to include the first sequence of oscillating frames.

BRIEF DESCRIPTION OF THE DRAWINGS

The following provides a description of certain embodiments with reference to the accompanying drawings, which are not to be considered limiting, and wherein.

DETAILED DESCRIPTION

Figure 1A:
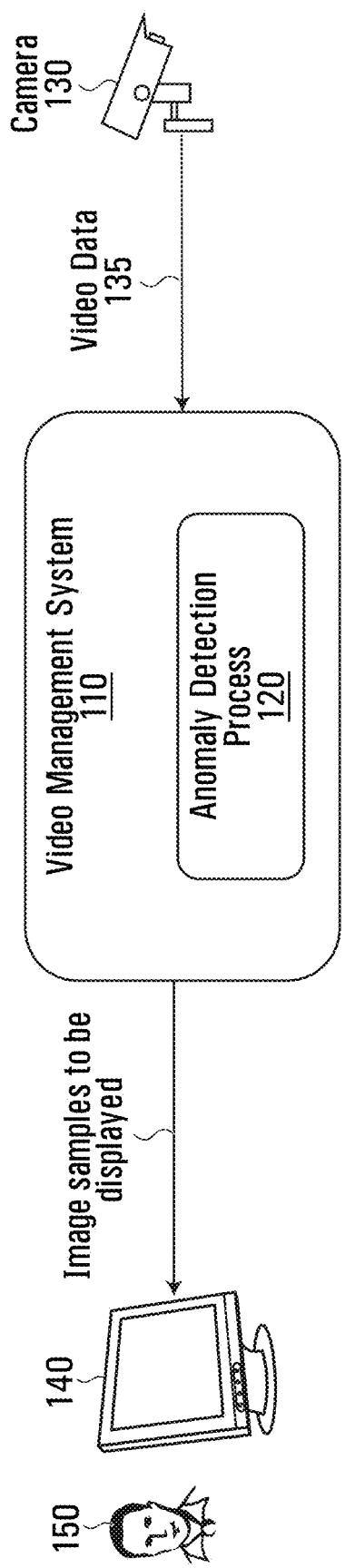
FIGS. 1A and 1B are block diagrams of two non-limiting embodiments of a video processing environment.

Reference is made to FIG. 1A, which is a block diagram of a first non-limiting embodiment of a video processing environment comprising an image acquisition device 130 (e.g., a camera), a video management system 110 and an output device 140 (e.g., a screen). The camera 130 supplies video data 135 to the video management system 110, typically over a network such as an in-building network. Other cameras may similarly supply video data to the video management system 110. The video management system 110 is configured to process the video data 135 from the camera 130 and possibly other cameras. In an embodiment, the video management system 110 is configured to carry out an anomaly detection process 120, which will be described in further later on. The video management system 110 may be an evolved version of an existing video management system, such as Security Center®, sold by Genetec Inc., Saint-Laurent, Canada. The screen 140 may be associated with a desktop computer, laptop, network operations center or mobile device, to name a few non-limiting possibilities.

Figure 1B:
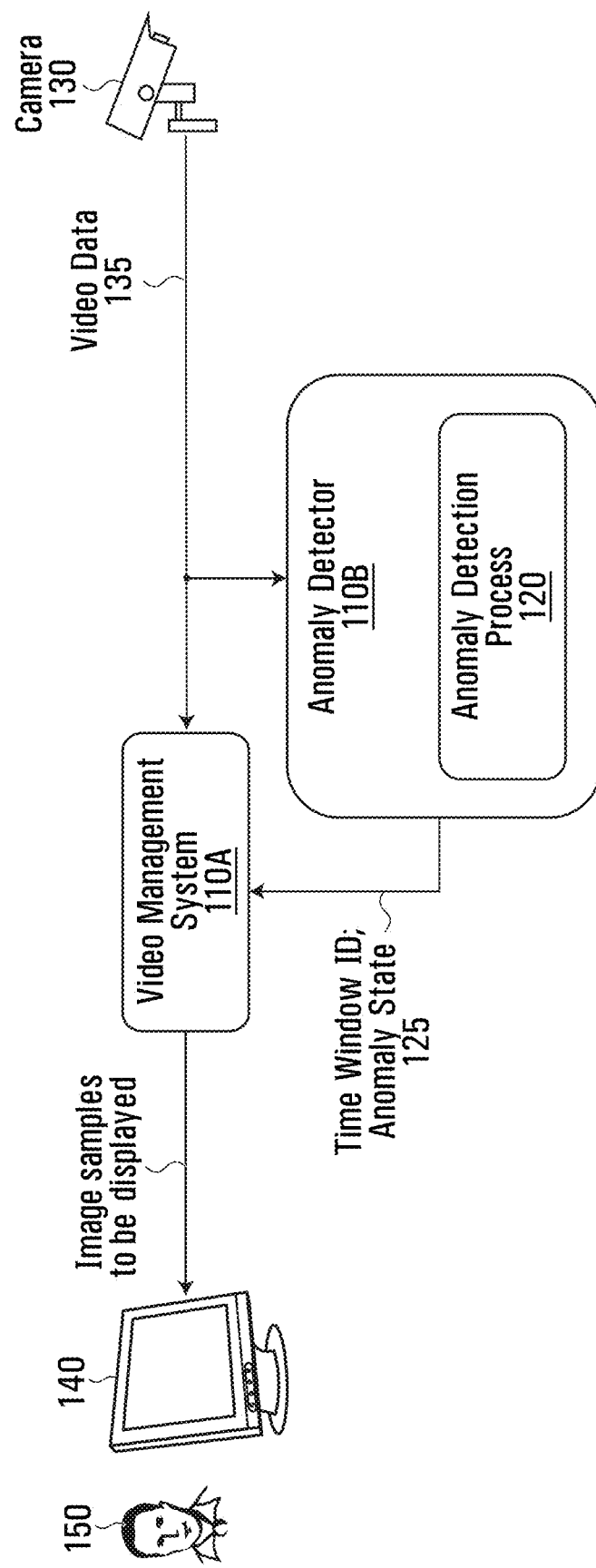

FIG. 1B is a block diagram of a second non-limiting embodiment of a video processing environment comprising the aforementioned image acquisition device 130 (e.g., a camera) and the aforementioned output device 140 (e.g., a screen). In this case, the video management system of FIG. 1A is replaced by a video management system 110A and a separate anomaly detector 110B. In this second embodiment, the video management system 110A and the anomaly detector 110B together execute certain functions of the video management system 110 of the first embodiment in FIG. 1A. For example, the anomaly detector 110B is specifically configured to carry out the aforementioned anomaly detection process 120.

Although FIGS. 1A and 1B show the camera 130 as being the source of the video data 135, this does not imply that the video data 135 is a live feed. In various examples of implementation, the video data 135 may be a live feed or it may be delayed by interim passage through a network, sanitization by a network sanitizer, or storage on a disk. In other embodiments, the video data 135 may be retrieved from memory at a user-defined time that is unrelated to the time when the images in the video data 135 were recorded.

The video data 135 may be raw or parametrized. In the case where it is raw, the video data 135 may include a sequence of image samples (sometimes referred to as frames). Each image sample may be an arrangement of pixels each having an intensity value. In the case where it is parametrized, the video data 135 may include data (parameters) that represent the image samples and requiring a decoder at the receiving end. For example, such data may include a compressed representation of an image sample or information about changes in intensity between an image sample and the immediately preceding image sample (such as by way of one or more motion vectors). This information may be encoded into the video data 135 in accordance with a particular standard. In such a case, a decoder with knowledge of the standard is needed in order to reconstruct the image samples for display on a screen (such as the screen 140). In contrast, raw video data may in some cases be directly displayed on a screen without having recourse to a decoder.

Figure 2:
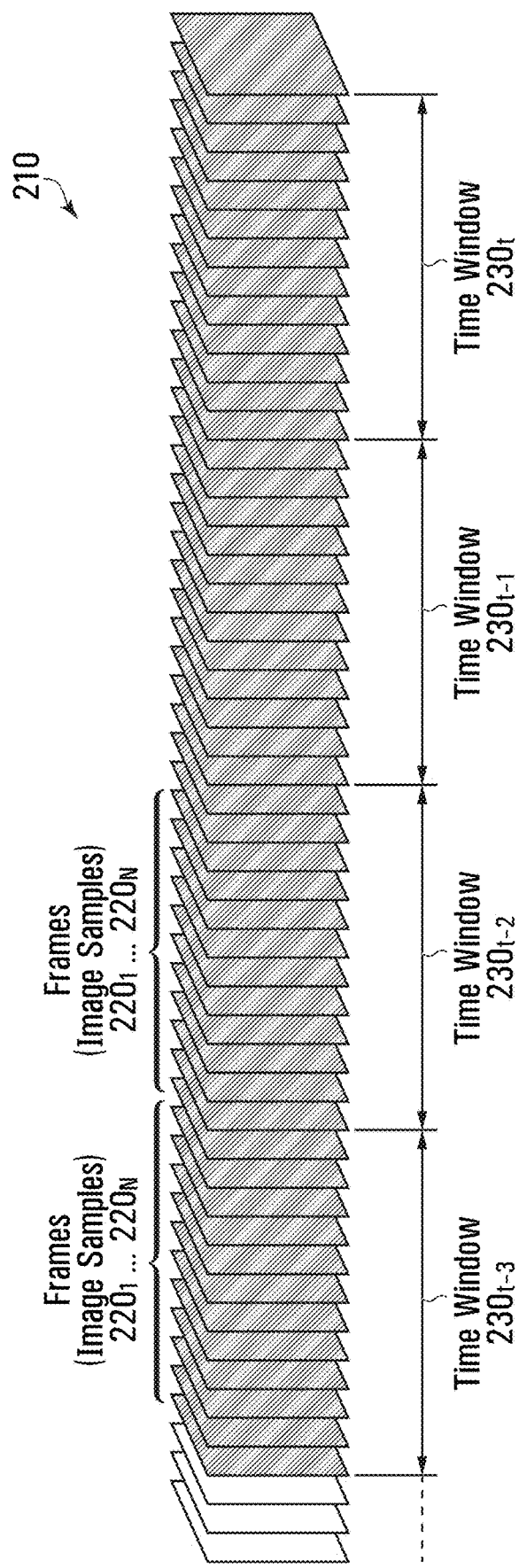
FIG. 2 illustrates a video stream made up of a plurality of time windows, each spanning a number of image samples.

FIG. 2 conceptually illustrates a plurality of image samples 210 associated with the video data 135. Adjacent image samples are separated in time by a time interval. In some embodiments, the time interval between subsequent image samples may be 200 ms, whereas in other embodiments, the image samples may be produced at a rate of 24 or 30 samples per second, to name a few non-limiting possibilities. It is recalled that where the video data 135 is raw, the video data 135 carries the intensity values of the pixels of the image samples 210, whereas where the video data 135 is parametrized (e.g., H.264 or H.265), the video data 135 carries a parametric representation the image samples 210.

The video data 135 can be considered as divided into portions. Specifically, the image samples 210 can be grouped into "time windows" denoted $230_{t-3}$, $230_{t-2}$, $230_{t-1}$, $230_t$, . . . . Each of the time windows is associated with N image samples $220_1$ . . . $220_N$. In one non-limiting embodiment, the value of N may be 20, which corresponds to 4 seconds (if adjacent image samples were separated by 200 ms). In other embodiments, the value of N may be 10, 50, 100 or any other positive integer value.

A limited number of time windows (for example, 64, 100, 150, 200 or 300 of time windows, without being limited thereto) may be stored in a buffer of temporary/volatile storage or may be committed to non-volatile memory (e.g., stored on a disk). For example, a circular buffer containing 150 time windows of 20 image samples per time window and 200 ms between adjacent image samples would thus be able to store video spanning 600 seconds (=10 minutes).

In an embodiment, the time windows $230_{t-3}$, $230_{t-2}$, $230_{t-1}$, $230_t$, . . . are non-overlapping, i.e., the image samples associated with each time window do not include any of the image samples associated with any of the other time windows. Alternatively or in addition, at least one of the image samples associated with each of the time windows $230_{t-3}$, $230_{t-2}$, $230_{t-1}$, $230_t$, . . . is associated only with that time window and not with any of the other time windows. Alternatively or in addition, at least one of the image samples associated with each of the time windows $230_{t-3}$, $230_{t-2}$, $230_{t-1}$, $230_t$, . . . is associated with at least another one of the time windows.

The anomaly detection process 120 is used in some embodiments of the present disclosure. The anomaly detection process 120 includes receiving the video data 135, processing it to identify an "anomaly state" of the various time windows and providing an indication of the anomaly state as an output.

In an embodiment, an "anomaly state" of a particular window reflects the anomalousness of the motion occurring in that time window. For example, in an embodiment, an "anomaly state" of a particular window reflects whether that there is a statistically abnormal increase in the motion occurring in that time window (low-motion to high-motion: this is termed "anomaly up", or "A+"), a statistically abnormal decrease in the motion occurring in that time window (high-motion to low-motion: this is termed "anomaly down", or "A−"), or neither (a situation that may be referred to as "no anomaly", or "A0"). In accordance with various embodiments, it is not relevant whether the scene captured in the video data is busy or quiet (i.e., it is not merely a function of the instantaneous or average amount of motion). That is to say, it is not because a time window captures a busy scene versus a quiet scene that it will necessarily be associated with an A+ anomaly state versus an A− anomaly state; rather, what will qualify a time window as having an A+ anomaly state is if the motion in the scene becomes statistically abnormally high, which requires insight into what is normal, i.e., looking at past behavior/evolution of the video relating to the scene in question. These subtleties may be captured by the anomaly detection process 120.

Figure 3:
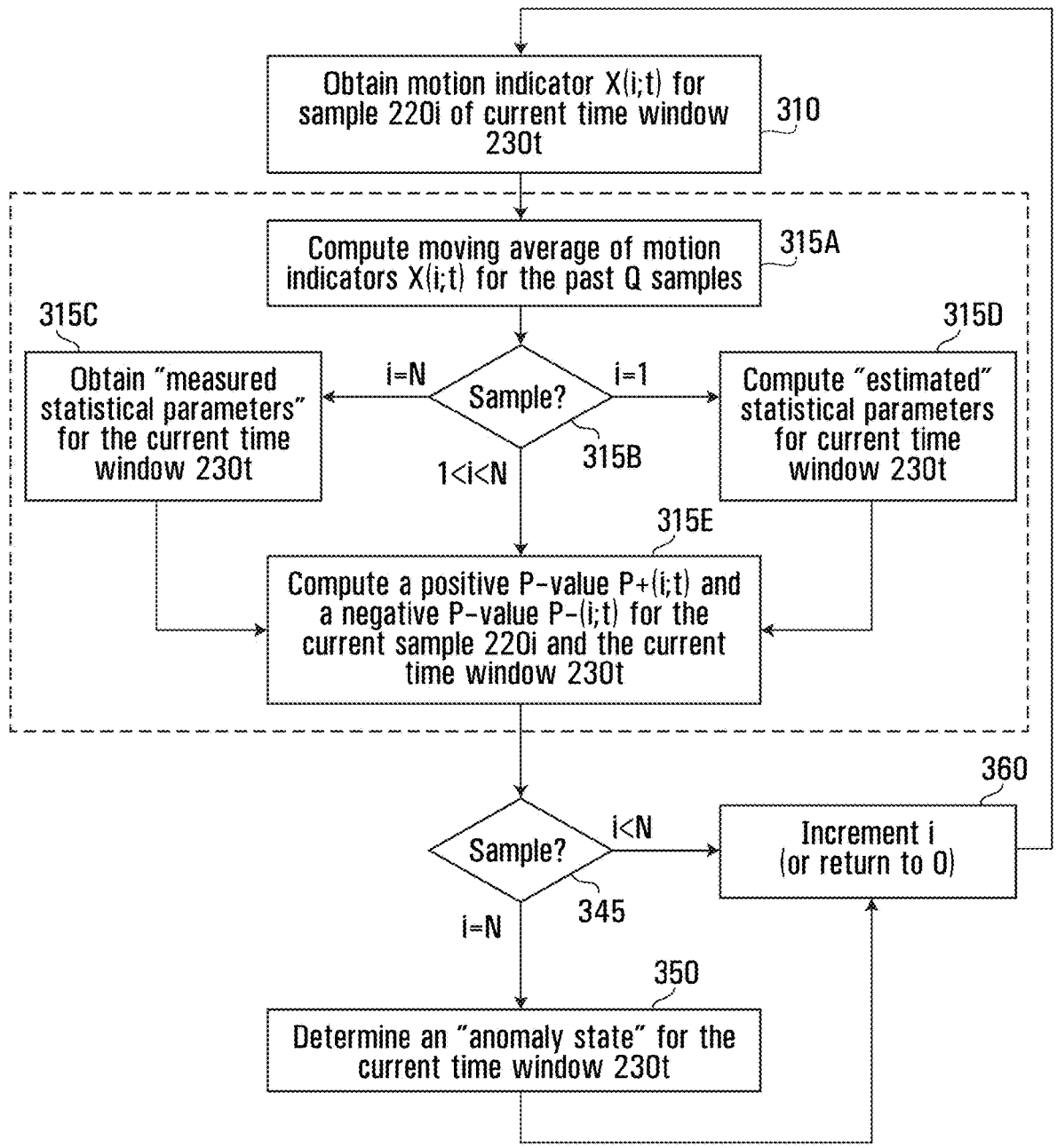
FIG. 3 is a flowchart showing steps in an anomaly detection process, in accordance with a non-limiting embodiment.

Reference is now made to FIG. 3, which is a flowchart showing steps forming part of the anomaly detection process 120 that could be executed by the anomaly detector 1108/video management system 110 at a certain rate (e.g., once per image sample, for example).

Step 310

The anomaly detection process 120 computes or otherwise obtains a "motion indicator" (denoted X(i; t)) for the "current sample" (denoted $220_1$) of the "current time window" (denoted 2300. The motion indicator X(i; t) could be obtained in various ways, depending on, for example, whether the video data 135 supplied to the anomaly detector 1108/video management system 110 is raw or parametrized.

In a first example embodiment, it is observed that video data encoded according to certain encoding standards (such as, for example, the H.264 standard) includes motion vectors embedded as part of the video data itself for each coded sample. Therefore, obtaining the motion indicator simply requires obtaining or determining the magnitude of the motion vectors for the current sample, which gives the percentage of motion in the scene relative to the previous sample. This is an example of where the motion indicator X(i; t) can be easily derived from information explicitly present in the available video data 135.

In a second example embodiment, assume that the video data 135 is raw. In this case, the anomaly detector 1108/video management system 110 computes the sum of differences between pixel intensity values from one image sample to the next. This broad measure of how much an image changes from one sample to the next can be an example of a "motion indicator", which in this example is not included in or trivially derived from the received video data 135 but is somewhat more complex to compute.

Figure 4:
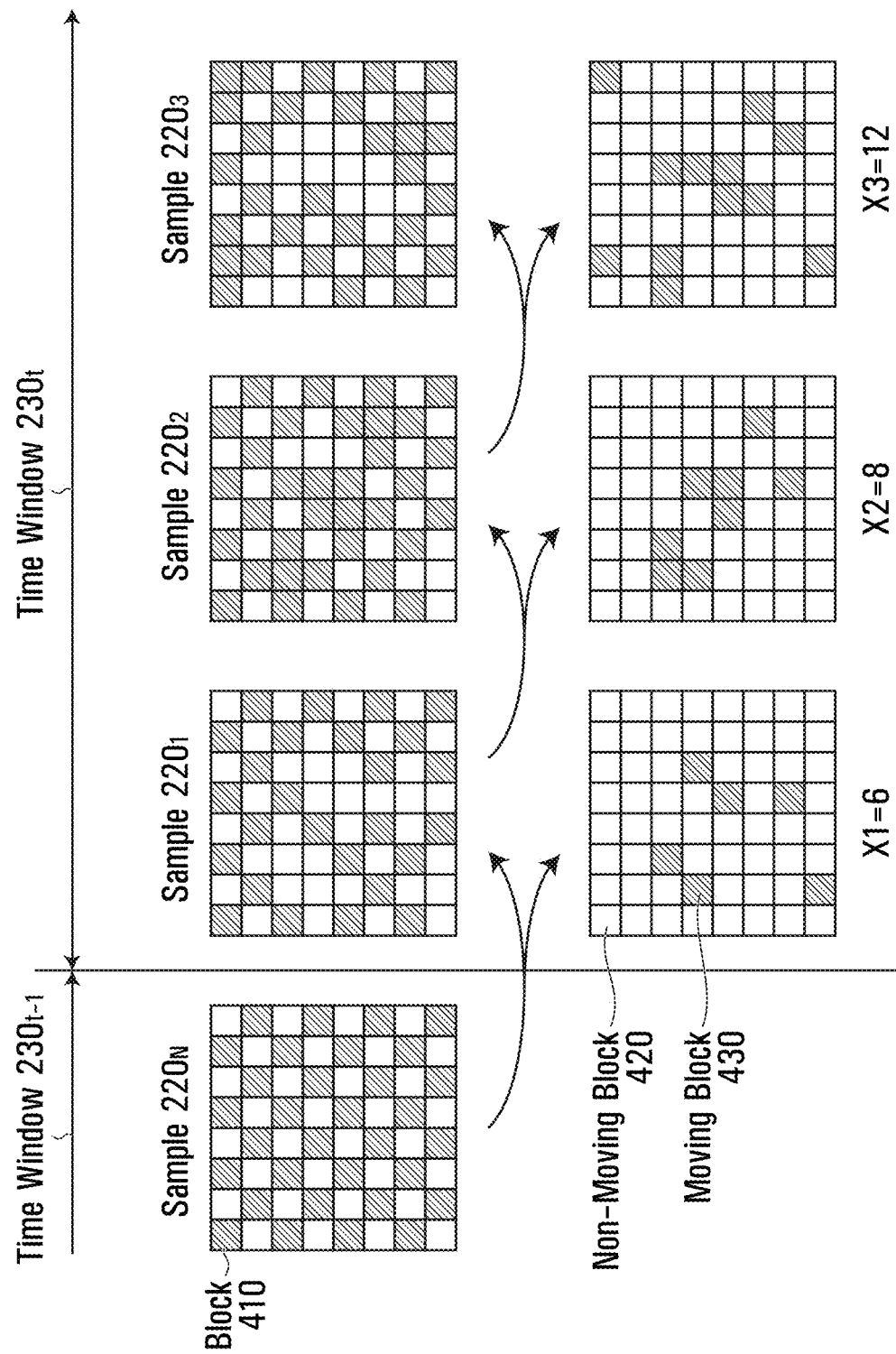
FIG. 4 illustrates a sequence of image samples including indicators of inter-sample motion.

In a third example embodiment, also assume that the video data 135 is raw. Referring to FIG. 4, there is shown a sequence of samples (the last sample $220_N$ of the previous time window $230_{t-1}$, the first sample $220_1$ of the current time window $230_t$, the second sample 2202 of current time window $230_t$ and the third sample 2203 of the current time window $230_t$). Here, the image represented by each sample is broken down into blocks; in this case there are 8×8=64 blocks. Then, the content of correspondingly positioned blocks is compared from sample to sample. Thus, for the first sample $220_1$ of the current time window $230_t$, the number of blocks that experienced a change in the level of inter-sample movement since the previous sample is 6, which gives a motion indicator of $X_1=6$. In the second sample 2202 of the current time window $230_t$, the number of blocks that experienced a change in the level of inter-sample movement since the previous sample is 8, which gives a motion indicator of $X_2=8$, and in the third sample 2203 it was 12, which gives a motion indicator of $X_3=12$.

There are of course other encoding standards (e.g., HEVC, VP9, AV1, . . . ) as well as other techniques for measuring or computing a change in motion from one image sample to the next, in order to obtain the sought-after motion indicator X(i; t) for the current sample $220_i$ and the current time window $230_t$; such other techniques may be used in the context of various embodiments.

The next step in the anomaly detection process 120 is Step 315A.

Step 315A

The anomaly detection process 120 computes a moving average of the motion indicators for the Q most recent image samples. Q is an integer that can be as small as 1 or arbitrarily large, even as large as N (the number of image samples per time window), or perhaps even larger. The moving average of the motion indicators for the Q most recent image samples is denoted $X_A(i; t; Q)$. As such, $X_A(i; t; Q)$ is the moving average of $X(i; t)$, $X(i-1; t)$, $X(i-Q+1; t)$ although where Q>i, this would involve motion vectors for image samples of the previous time window $230_{t-1}$ as well. The anomaly detection process 120 proceeds to step 315B.

Step 315B

The anomaly detection process 120 determines whether the current sample $220_1$ is the first sample in the current time window $230_t$ (i.e., i=1, in which case the anomaly detection process 120 proceeds to Step 315D), the last sample in the current time window $230_t$ (i.e., i=N, in which case the anomaly detection process 120 proceeds to Step 315C) or neither (i.e., 1<i<N, in which case the anomaly detection process 120 proceeds to Step 315E).

Step 315C

This step is entered when i=N, i.e., the current sample $220_1$ is the last (Nth) sample in the current time window $230_t$. The anomaly detection process 120 measures certain "statistical parameters" of the various motion indicators $X(i; t)$ for the current time window $230_t$ to obtain certain "measured statistical parameters" for the current time window $230_t$. For example, the "measured statistical parameters" could be the "measured mean" (denoted $M_t$) and the "measured variance" (denoted $V_t$) of the N motion indicators $X(i; t)$, i=1 ... N, computed over the N samples $220_1$ ... $220_N$ in the current time window $230_t$. However, this need not be the case in all embodiments, namely other statistical parameters could be used, and they need not be measured over the entire number of N samples in the current time window $230_t$.

The measured statistical parameters for the current time window $230_t$ (in this case, the measured mean $M_t$ and the measured variance $V_t$) are stored for future use, that is to say, when the anomaly detection process 120 is executed for a later sample that may not be the last sample of a time window. (It follows that the measured statistical parameters for previous time windows would be available as they would already have been computed in the past. For example, this is the case with the measured mean $M_{t-1}$ and the measured variance $V_{t-1}$ for prior time window $230_{t-1}$, as well as the measured mean $M_{t-2}$ and the measured variance $V_{t-2}$ for prior time window $230_{t-2}$, and so on.) The anomaly detection process 120 proceeds to Step 315E.

Step 315D

This step is entered when i=1, i.e., the current sample $220_1$ is the first sample in the current time window $230_t$. The anomaly detection process 120 computes certain "estimated" statistical parameters of the various motion indicators $X(i; t)$ expected to be computed during the current time window $230_t$. In this non-limiting example, the estimated statistical parameters include an "estimated mean" and an "estimated variance" of the motion indicators expected to be computed during the current time window $230_t$. The estimated mean is denoted $M^*t$ and the estimated variance is denoted $V^*t$.

Calculation of the estimated statistical parameters can be done according to formulae that look back at the "measured mean" and the "measured variance" of the motion indicators for one, two or more previous time windows, namely $M_{t-1}$, $M_{t-2}$, ... and $V_{t-1}$, $V_{t-2}$, It will be appreciated that these values are available due to having been computed during previous instantiations of Step 315C of the anomaly detection process 120.

In a specific non-limiting embodiment, the following formulae for the estimated mean $M^*_t$ and the estimated variance $V^*_t$ of the motion indicators for the current time window $230_t$ could be used:

$$M_t^* = \alpha M_{t-1} + (1-\alpha)M_{t-2}$$

$$V_t^* = \alpha V_{t-1} + (1-\alpha)V_{t-2} + \alpha(1-\alpha)(M_{t-2}-M_{t-1})^2$$

where the parameter $\alpha$ (alpha) is referred to as a "weight". The weight could be a variable that is user-determined. It may be different in each of the above formulae, i.e., a different weight may be used for the estimated mean $M^*t$ and the estimated variance $V^*t$. The weight is an indication of how much influence the measured mean and measured variance of the motion indicators for the immediately preceding time window $230_{t-1}$ have on the estimated mean and the estimated variance of the motion indicators for current time window $230_t$, relative to the measured statistical parameters of the even earlier time windows $230_{t-2}$, etc. It will be noted that the right-most term in each of the aforementioned formulae captures the influence of all previous time windows. This is a result that is expected from a mathematical assumption that the distribution of the motion indicators $X(i; t)$, i=1 ... N, for the N samples $220_1$ ... $220_N$ in the current time window $230_t$ is a normal (Gaussian) distribution. In other embodiments, it may be possible to limit how far back one goes to consider past contributions of the measured mean and measured variance to the estimated mean and estimated variance for the current time window $230_t$. The anomaly detection process 120 proceeds to Step 315E.

Step 315E

Based on $X_A(i; t; Q)$, namely, the moving average of the last Q motion indicators (when considering the current sample $220_1$ of the current time window $2300$, and also based on the estimated mean $M^*t$ and the estimated variance $V^*t$ of the motion indicators for the current time window $230_t$, the anomaly detection process 120 computes a positive P-value P+(i; t) and a negative P-value P−(i; t) for the current sample $220_1$ and the current time window $230_t$.

In a non-limiting example embodiment, to compute the positive P-value P+(i; t) and the negative P-value P−(i; t) for the current sample $220_1$ and the current time window $230_t$, an assumption is made that the moving average motion indicators $X_A(i; t; Q)$, obey an underlying distribution (behavior) of a certain type (such as normal or beta, by way of two non-limiting examples).

Then, for moving average motion indicator $X_A(i; t; Q)$, the anomaly detection process 120 computes the "one-tail, positive P-value P+(i; t)", which is the likelihood of obtaining a motion indicator greater than or equal to $X_A(i; t; Q)$, if the set of motion indicators were indeed governed by the underlying (hypothesized) probability distribution. Mathematically, the one-tail, positive p-value P+(i; t) can be calculated as follows (where P+(i; t) is denoted $P^+$ for short):

$$P^+ = 1 - F(X_i | M_t', V_t^*),$$

where F( ) is the cumulative density function (CDF) of the one-dimensional hypothesized probability distribution which is defined as:

$$\frac{1}{2}\left[1 + \text{erf}\left(\frac{X_t - M_t^*}{\sqrt{2V_t^*}}\right)\right],$$

in the case where the hypothesized probability distribution is a normal distribution.

Conversely, the anomaly detection process 120 also computes the "one-tail, negative p-value" P−(i; t), which is the likelihood of obtaining a motion indicator less than or equal to $X_A$(i; t; Q), if the set of motion indicators were indeed governed by the underlying (hypothesized) probability distribution. This can be computed mathematically as:

$$P^- = F(X_t | M_t^*, V_t^*) = 1 - P^+.$$

Generally speaking, these instantaneous positive and negative P-values will, depending on their values, be representative of either a detected instantaneous anomalous increase in motion, a detected instantaneous anomalous decrease in motion or neither. In some embodiments, what is detected in this way is a relative deviation of the statistical behavior of $X_A$(i; t; Q), compared to what is considered "normal" based on the measured mean and measured variance of the motion indicators in past time windows. The anomaly detection process 120 proceeds to Step 345.

Step 345

The anomaly detection process 120 determines whether i=N, i.e., whether the current sample 220₁ is the last sample in the current time window 230$_t$. If yes, the anomaly detection process 120 proceeds to Step 350, otherwise the anomaly detection process 120 proceeds to Step 360.

Step 350

This step is entered once per time window when i=N, in other words when the current sample 220₁ is indeed the last sample in the current time window 230$_t$. The anomaly detection process 120 determines an "anomaly state" for the current time window 230$_t$. This is obtained based on the various positive and negative P-values computed for the N samples 220₁ ... 220$_N$ of the current time window 230$_t$ (i.e., P+(i; t) and P−(i; t), i=1 ... N). Specifically, one first computes the average (e.g., mean) positive P-value (denoted P+$_A$(t)) and the average (e.g., mean) negative P-value (denoted P−$_A$(t)) over the N samples in the time window. Then, based on these average positive and negative P-values P+$_A$(t) and P−$_A$(t), the anomaly detection process 120 determines an "anomaly state" for the current time window 230$_t$.

For example, if P+$_A$(t) (i.e., the average positive P-value taken over all N samples associated with the current time window 2300 is less than or equal to a threshold A (of, say, 0.05), this means that it is highly likely (if one's assumption about the underlying statistical behavior is correct) that one is dealing with an outlier time window. As such, this associated level of motion is considered "abnormally high" (or statistically abnormally high), and an anomaly state of "A+" can be associated with the current time window 230$_t$.

For its part, if P−$_A$(t) (i.e., the average negative P-value taken over all N samples associated with the current time window 2300 is less than or equal to a threshold B (of, say, 0.05), this means that it is highly likely (if one's assumption about the underlying distribution was correct) that one is dealing with an outlier time window. In this case, the associated level of motion is considered "abnormally low" (or statistically abnormally low), and an anomaly state of "A−" can be associated with the current time window 230$_t$.

In the case where the value of P+$_A$(t) is greater than A and the value of P−$_A$(t) is greater than B, then an anomaly state of "A0" ("no anomaly") can be associated with the current time window 230$_t$. In this case, the associated level of motion is considered neither abnormally low nor abnormally high. It should be noted that A and B may be the same value in some embodiments, although this is not a requirement.

In some embodiments, the aforementioned averages P+$_A$(t), P−$_A$(t) can be moving averages taken over the samples looking back over more than one time window, e.g., the current time window 230$_t$ and one or more time windows 230$_{t-1}$, 230$_{t-2}$, etc. that precede the current time window 230$_t$.

The anomaly detection process 120 advances to Step 360.

Step 360

The anomaly detection process 120 increments the value of i (unless i already equals to N, in which case i is reset to zero and the value of t is incremented) and returns to Step 310 to obtain a motion indicator for the next sample.

In summary, an anomaly state is obtained for each time window of the video data 135. The anomaly state is obtained by (i) obtaining estimated statistical parameters for the current time window based on measured statistical parameters characterizing the motion indicators for the samples in at least one time window of the video stream that precedes the current time window (considered "normal motion"); and (ii) determining the anomaly state for the current time window based on the estimated statistical parameters and motion indicators obtained for the samples in the current time window. In particular, statistical hypothesis testing under certain assumptions is conducted to determine if in the current time window contains motion that is normal or anomalous.

It is also noted that thresholds A and B may be kept constant throughout the processing of the video stream, yet they will still enable detection of abnormal increases or decreases in motion, even if what is considered "abnormal" changes over time as the video data 135 undergoes changes in the average amount of motion from one time window to the next. This occurs because a change in the anomaly state is triggered a function of estimated and computed statistical parameters, which may fluctuate from one time window to the next. Thus, the thresholds A and B may be considered robust in the face of fluctuations in the average amount of motion being captured.

Those skilled in the art will appreciate that in the case of a hypothesized normal distribution, the statistical parameters include the mean and the variance (or standard deviation) that are used to characterize the distribution. In the case of a beta distribution characterized by shape parameters α and β, the statistical parameters may be α and β. When the underlying hypothesized distribution is different from normal or beta (e.g., gamma), other statistical parameters may be computed and estimated, as long as at least two such statistical parameters are used.

Figure 8:
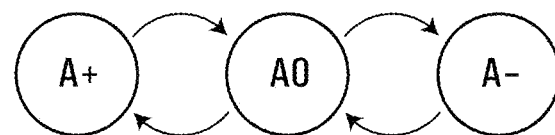
FIGS. 8 and 9 illustrate finite state machines that may be used to represent changes in anomaly state of a video stream, in accordance with non-limiting embodiments.
Figure 9:
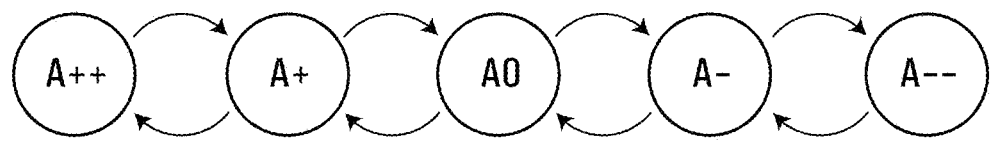

From the above, it will be appreciated that the anomaly state produced at Step 350 can be indicative of the current time window 230$_t$ exhibiting an anomalous increase in motion (denoted A+), an anomalous decrease in motion (denoted A−) or neither (denoted A0). Transitions between anomaly states may be represented by a finite-state-machine (FSM), illustrated in FIG. 8 where the FSM can transition from anomaly state A+ to anomaly state A0 and vice versa, as well as from anomaly state A− to anomaly state A0 and vice versa, but not directly between anomaly states A+ and A−. The notion of a FSM is not restricted to 3 anomaly states, and can be any number of anomaly states greater than 2. For example, an expansion into a higher number of anomaly states (multi-threshold) can be done where one has a "mild" increase/decrease of anomalous motion and a "severe" increase/decrease of anomalous motion, providing in this case 5 states for how anomalous the level of motion can be in a given time window. For example, these can be associated with two values of the "A" threshold (corresponding to states A++ and A+) and two values of the "B" threshold (corresponding to states A− and A−−), as is illustrated in FIG. 9.

Figure 10:
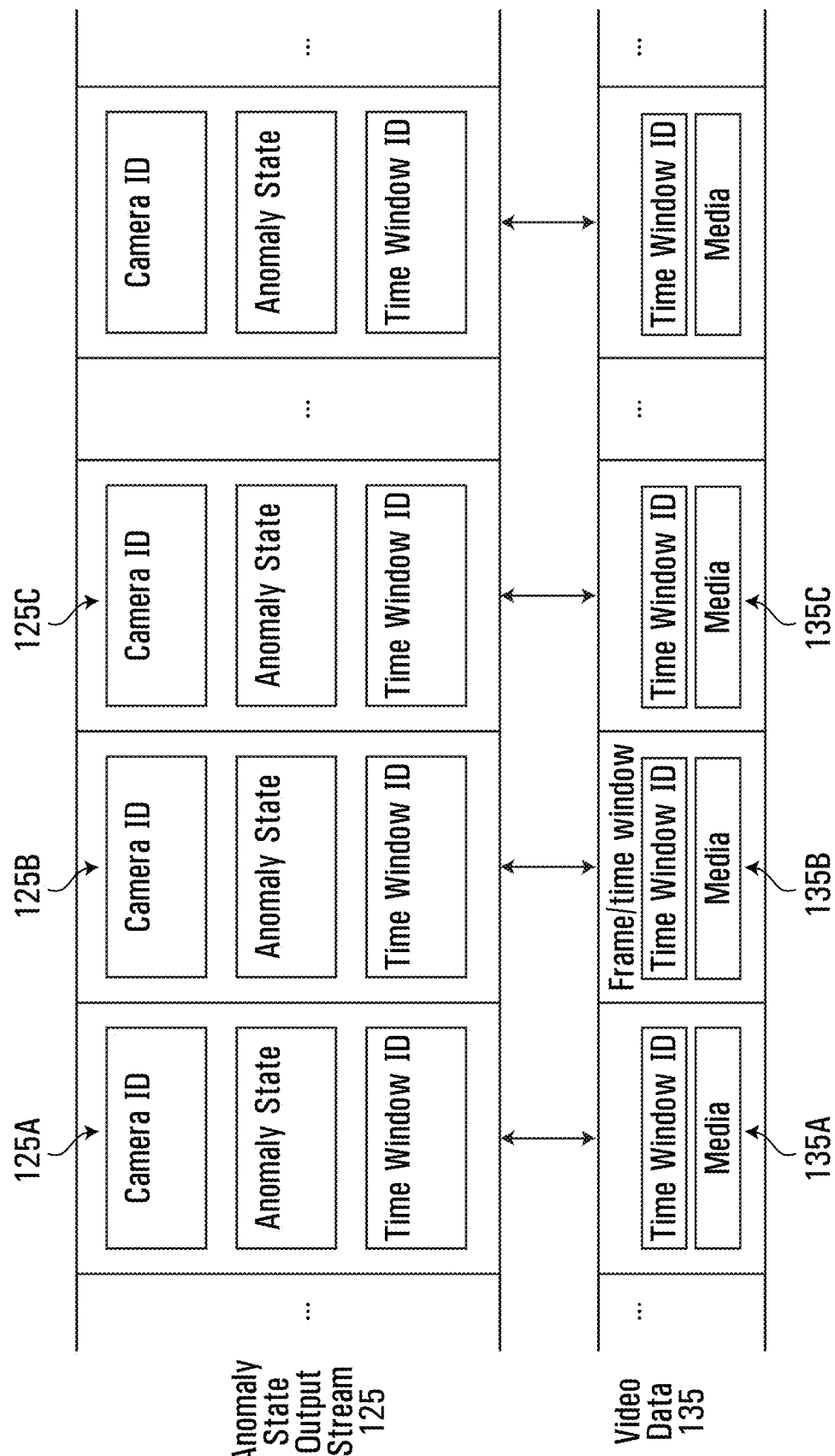
FIG. 10 conceptually illustrates an anomaly state output stream, in accordance with a non-limiting embodiment.

Multiple passes through Step 350 for multiple time windows of the video data 135 result in the creation of an anomaly state output stream 125, which is shown in FIG. 10 by way of non-limiting example. The anomaly state output stream 125 can include a stream of data sets 125A, 125B, 125C, each data set including an ID ("time window ID") of a given time window 135A, 135B, 135C, of the video data 135 and the anomaly state for the given time window (as computed by Step 350 when that time window was the "current time window" during execution of the anomaly detection process 120), and possibly also an identifier of the image acquisition device (e.g. camera) 130 that originated the given time window, which may be useful in a multi-camera environment. The anomaly state stream 125 may be stored in memory or transmitted in real-time.

In some cases it may be desirable to keep statistics on the statistics. In other words, a data structure may be created in the memory for storing an association between video streams (e.g., according to video stream ID) and the relative number of time windows spent in each of the various anomaly states (e.g., A−, A0 and A+). This data structure may be in the form of a table and may be updated after the anomaly state of each time window has been computed. The table may include a record including an ID field with the identifier of the video stream, and a plurality of fields, one for each particular anomaly state and holding a count of the number of time windows in that particular anomaly state. The table may also compute the percentage of the total time spent in each state. The contents of the table may be read by the video management system 110/110A and displayed on the display 140. As such, in a non-limiting example, the operator may be presented with at-a-glance information on multiple video streams, each with a data element indicating the percentage of time that the corresponding video stream has spent in, say, anomaly state A+. This allows the operator to compare the relative "anomalounsess" of various streams. This may lead the operator to perform various actions, such as adjust the sensitivity (e.g., thresholds A and B against which the p-values are compared) or zero in on specific video streams having, e.g., greater anomalousness. In an alternative embodiment, the record for a particular video stream may indicate the total amount of time spent in a particular anomaly state.

Test Bed

The above teachings can be used to devise a test bed for determining whether or not a particular detector (a "detector under test"—DUT) is configured to detect abnormal changes in motion. For example, a DUT may be configured to receive a video stream and produce an output stream based on the video stream. The output stream can indicate a value for each time window of the video stream. It may not be known a priori whether the DUT is configured to perform detection of abnormal changes in motion as opposed to performing mere "motion level" threshold detection. By use of the test bed, one may be able to determine whether the DUT is configured to perform detection of abnormal changes in motion as opposed to performing mere "motion level" threshold detection. Specifically, by constructing the video stream a certain way, if the DUT is an anomaly state detector implementing one of the previously described (statistics-based) techniques, then the values in the output stream will exhibit certain first behavior, and if the DUT is a standard "motion level" detector, then the values in the output stream will exhibit certain second behavior. This will now be described in further detail.

Figure 15:
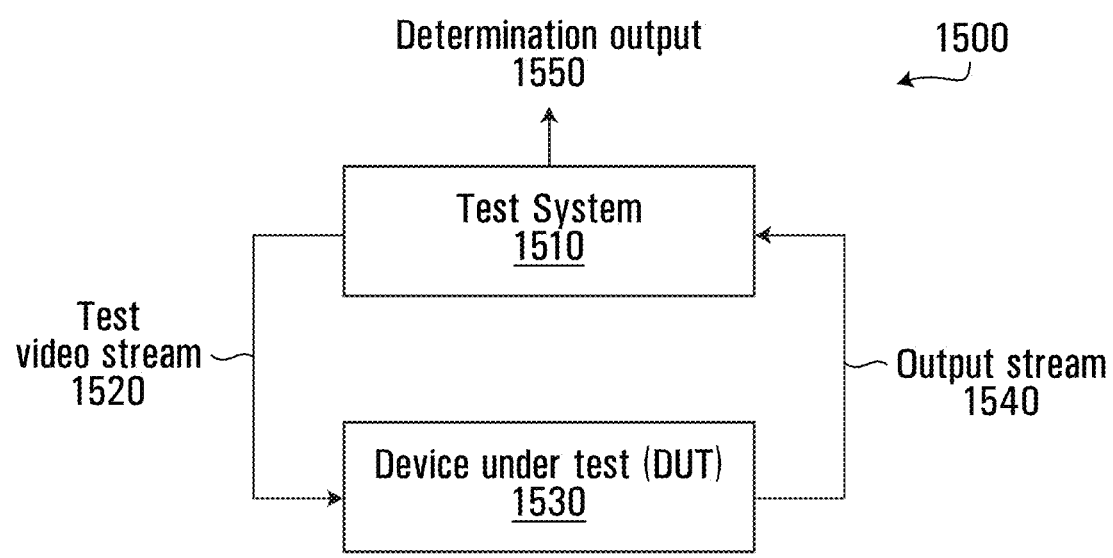
FIG. 15 is a block diagram depicting a test bed for determining whether a device under test exhibits statistical anomaly detection capabilities, in accordance with a non-limiting embodiment.

In this regard, and as shown in FIG. 15, a test bed 1500 comprises a test system 1510 that outputs a test video stream 1520 having certain predetermined characteristics that can be designed or selected during a preliminary phase. The test video stream 1520 is provided to a detector under test (DUT) 1530. The DUT 1530 produces an output stream 1540 that indicates a value for each time window of the test video stream 1520. This value may be binary or ternary, for example. For instance, the DUT 1530 may produce an output value for each time window that is selected between "motion" and "no motion". This may suggest to an external observer that the DUT 1530 is a "standard" motion detector with an (unknown, hypothetical) internal motion level threshold $M^{HYP}_{ON}$ above which the output is set to "motion". The possibility may exist of an (unknown, hypothetical) internal level threshold $M^{HYP}_{OFF}$ (different from $M^{HYP}_{ON}$) below which the output changes from "motion" to "no motion".

As such, to the external observer, the DUT 1530 with this type of output stream 1540 may appear to function as a standard motion level detector. However, it is conceivable that the DUT 1530, despite its external appearance, is actually functioning as an anomaly detector that implements one of the previously described anomaly detection approaches. This is a situation where a DUT purporting to be a standard motion level detector is actually implementing an anomaly detector (detecting abnormal changes in motion as described earlier in this document). It is through careful design of the characteristics of the test video stream 1520 that this situation can be uncovered.

Accordingly, in the context of the embodiment of FIG. 15, the output stream 1540 is fed as an input to the test system 1510 for analysis. The test system 1510 then produces a determination output 1550. The determination output 1550 may be as simple as a binary value (yes/no) indicative of the answer to the question "Does the DUT 1530 perform statistical anomaly detection?"

In order to answer this question and set the value of the determination output 1550, the test system 1510 includes a processor that executes computer-readable instructions stored in a memory. When executed, the computer-readable instructions cause the processor to process the output stream 1540 as a function of the predetermined characteristics of the test video stream 1520. By having carefully designed the test video stream 1520 to have certain predetermined characteristics, it is possible to infer, from the output stream 1540, the inner workings of the DUT 1530 to some degree. In one embodiment, it is possible to determine whether the DUT 1530 secretly functions as an anomaly detector while suggesting to the outside world that it functions as a standard motion level detector.

More specifically, two design cases are considered, one for raw/MPEG video and one for parametrized video, each of which will be approached separately. In the raw/MPEG design case, motion estimation is done on a pixel-by-pixel basis. Consider each pixel of the test video stream 1520 to be an unsigned character ranging from (0-255). There are many formats for raw and MPEG however (e.g. YUV422, Y800, etc., more information can be found at http://www-.fourcc.org/yuv.php, hereby incorporated by reference herein). In any event, the test video stream 1520 may be constructed with pixels that are varied by the same amount, which could be a certain user-definable percentage V.

Assume for the time being that the DUT 1530 purports to be a standard motion detector. In that case, it uses a hypothetical "motion on threshold", denoted $M^{HYP}_{ON}$. Since V is user-definable, it can be adjusted so as to have a value that will always cause the level of motion to exceed whatever value of $M^{HYP}_{ON}$ might by used by the DUT 1530 if it is a standard motion detector (e.g., such as is found in customary camera/video management systems).

As such, by choosing V, each component of the underlying video feed can be guaranteed to vary by more than $M^{HYP}_{ON}$% between frames. As such, assume that the first frame is designed to have the following set of pixel values:

Frame 1: [0, 0, 0, 0, 0, 0, 0, 0, . . . ] (this arrangement of pixel values can be referred to as "Set A").

Then, the next frame may be designed have the following set of pixel values:

Frame 2: [255*V/100, 255*V/100, 255*V/100, 255*V/100, . . . ] (this arrangement of pixel values can be referred to as "Set B")

A sequence of frames (Frame 1, Frame 2, Frame 3, Frame 4, Frame 5, . . . ) is thus produced having the above alternating sets of pixel values (Set A, Set B, Set A, Set B, Set A, . . . ), where every pixel between adjacent frames varies by exactly V percent. The test video stream 1520 would look like "noise" if someone were to watch it directly on a screen; however, mathematically it results in an exact, measurable degree of motion.

This variation in pixel values (oscillating between Set A and Set B between frames) makes a significant difference on the output stream 1540 depending on the type of DUT 1530, namely whether the DUT 1530 is a standard motion detector or implements a statistical algorithm to detect motion anomalies.

For instance, in the case where the DUT 1530 implements variance-based statistical anomaly detection as described herein above, there would at first be a detection of an anomaly (e.g., anomaly state becomes A+). Thereafter, a "burn-in" would set in, where after the above alternating sequence of frames has been running for a period of time, the variance decreases to at/near zero, to the point where there is considered to no longer be any anomalous motion (i.e., anomaly state becomes A0). The output stream 1540 would therefore change values at some point in the above sequence of frames.

However, in the case where the DUT 1530 implements standard level-based motion detection (for some unknown value of $M^{HYP}_{ON}$), the above sequence of frames in the test video stream 1520 would trigger a "motion on" condition, as V has been selected to be high enough. This motion-on condition would remain unchanged throughout the sequence of frames, as there is no "burn-in period", and thus the output stream 1540 would not change values throughout the above sequence of frames.

As such, based on the behavior of the output stream 1540 throughout the above sequence of frames (alternating between Set A and Set B) it is possible to infer the type of motion detection being performed by the DUT 1530.

For added confidence in determining the type of motion detection being performed by the DUT 1530, one can increase V to 100% after a certain number of alternating frames/amount of time (e.g., 1 minute, 10 minutes, 30 minutes, etc.) This means that at a given point in time (e.g., at frame "X"), under control of the test system 1510, the video stream 1520 now includes frames with the following sets of pixel values:

Frame X: [0, 0, 0, 0, 0, 0, 0, 0, . . . ] ("Set A");
Frame X+1: [255, 255, 255, 255, 255, 255, 255, 255, . . . ] (this arrangement of pixel values can be referred to as "Set C");
Frame X+2: [0, 0, 0, 0, 0, 0, 0, 0, . . . ] ("Set A");
Frame X+1: [255, 255, 255, 255, 255, 255, 255, 255, . . . ] (Set "C");
Etc.

This would change the motion indicator from V % to 100%. Assuming the variance before the processing of Frame X would have been zero or close to zero, the arrival of frames X, X+1, etc. now changes the variance. This triggers an anomalous motion "high" event (i.e., anomaly state A+) if the DUT 1530 were using a statistical anomaly detection algorithm (with any probability distribution parametrized by at least 2 variables so the variance can be independent of the mean estimate). As such, the output stream 1540 would change values very quickly after Frame X.

Yet no change in the output stream 1540 would occur if a standard motion detector were being used, because the output stream 1540 continues to signal high motion from the previous set of frames (because V was pre-selected to cause a high motion level).

In summary, based on a test video stream 1520 being constructed as discussed above:

If the DUT 1530 is not using a standard variance-based motion level detection algorithm, then one expects that the output stream 1540 signals an event which will be raised once the test video stream 1520 (with V % motion) starts playing. Then, when the change comes to V=100% motion, one expects that no further events will be raised since the DUT 1530 will already be in a (traditional) motion "on" state. In this case, the determination output 1550 may be set to signal that the DUT 1530 implements standard motion level detection.

If the DUT 1530 is using a statistical variance-based anomaly detection algorithm (with any probability distribution which estimates the mean separate from the variance), then one expects that the output stream 1540 signals an event which will be raised once the test stream 1520 starts playing (this is due to any possible starting values); however it would eventually go back to "normal" (again depending on the initializing values for the mean and variance), and then would rise again when the test stream 1520 changes to V=100% motion. In this case, the determination output 1550 may be set to signal that the DUT 1530 implements statistical anomaly detection.

As such, the test system 1510 can be used to supply a test video stream 1520 to the DUT 1530 in order to determine the anomaly detection behavior of the DUT 1530 irrespective of external indicators (e.g., marketing, labeling) that suggests standard behavior.

In the parametrized video design case (e.g., H.264 and H.265), the video feeds are unique in that the "motion vectors" are encoded in the headers of the video feeds themselves. Traditional pixel-by-pixel motion detection may not be suitable for these types of video streams. Motion detection in this case may be achieved by reading the motion vectors and computing the "magnitude" of the vectors. As such, one need not generate pixel changes that then result in desired motion vectors, but rather one can create "fake" motion vectors themselves such that they encode V % motion for a sufficiently long time to allow the estimated variance to go towards near 0. Thereafter, the fake motion vectors can be changed to 100% to trigger a new change in anomaly state (A+). In this case, the actual image content of the resulting test video stream 1520 video; one only needs to create the "fake" motion vectors.

More generally, it will be appreciated that the following protocol may be followed in order to provide a test bed for a device under test (DUT) whose ability to detect anomalous motion in a statistical fashion is being determined:

(a) Design a test video stream having the following frame content (each "Set" represents a certain set of pixel values for the frame):
  Set A, Set B, Set A, Set B, . . . (for a certain amount of time, e.g., 1 minute, 5 minutes, etc.)
  Set A, Set C, Set A, Set C, . . . (for a certain amount of time, e.g., 1 minute, 5 minutes, etc.)
  where A→B represents a V % change in motion and A→C represents a 100% (or almost 100%) change in motion.
(b) Apply the test video stream to the device under test that produces an output stream indicative of some value for each frame (this is the unknown information: does this value represent a statistical anomaly?);
(c) Monitor the output stream and fit it into either one of several, e.g., two behavior patterns (variable: e.g., "up, down, up") or flat (constant: e.g., "up"). The detected behavior pattern is mapped to either a standard motion level detector or a statistical motion level detector associated with the device under test.

The above protocol may need to be conducted several times for different (e.g., increasingly higher) values of V to ensure reliable data collection, and eliminate the possibility of falsely declaring that the DUT exhibits statistical anomaly detection behavior when in fact it is a standard motion level detector with a motion level threshold $M^{HYP}_{ON}$ that is relatively high.

Therefore, it will be appreciated that the DUT has a processor which is configured such that when the input video stream is characterized by a sequence of oscillating frames having a % motion change of M from one frame to the next for a non-zero value of M that is less than 100%, the output stream is characterized by first change in the output stream that lasts for a certain number of oscillating frames in the video stream (the "burn-in"). This is followed by a change in the output stream to a second value, which from that point on ceases to change while the first sequence of frames in the input video stream continues to oscillate in the same way. In an example, M may be at least 25%, at least 50%, at least 90%, at least 95%, etc.

Then, when the input video stream includes a new, second sequence of oscillating frames, this time having a 100% motion change from one frame to the next, the output stream is characterized by another change in the output stream (similar to the first change) that lasts for a certain number of oscillating frames in the input video stream. This followed by a fourth change in output value back to the second value mentioned above, which from that point on ceases to change while the video stream continues to include the second sequence of oscillating frames.

Of course, modifications may be made to the above protocol to meet operational requirements.

Applications

In the embodiment of FIG. 1A, the anomaly state output stream 125 can be stored in memory (e.g., a volatile or non-volatile storage medium) and used by the video management system 110. In the embodiment of FIG. 1B, the anomaly detector 110B may supply the anomaly state output stream 125 to the video management system 110A. The video management system 110/110A may then process the video data 135 based on the anomaly state output stream 125 and, depending on the application, take an appropriate action. Examples of such processing and actions are now described.

Example 1: Video Summary

In this example, processing the video stream data 135 may involve identifying "video segments of interest". In an example embodiment, a "video segment of interest" may include any time window in the video data 135 for which the anomaly state meets certain criteria. This information can be obtained from the anomaly state output stream 125 (e.g., data sets 125A, 125B, 125C, . . . ).

The criteria could be, for example:
An anomaly state of interest:
  The anomaly state equals A+;
  The anomaly state equals A+ or A−;
An anomaly state transition of interest:
  The anomaly state equals to A+ and is different from the anomaly state of the previous time window (e.g., the anomaly state has transitioned from A0→A+);
  The anomaly state equals to A− and is different from the anomaly state of the previous time window (e.g., the anomaly state has transitioned from A0→A−).

As such, the video management system 110/110A may be configured to identify the A0→A+ (or A0→A−) anomaly state transitions from the anomaly state output stream 125, and to extract the corresponding time windows from the video data 135, as well as the time windows for which the anomaly state remains A+ (or A−) and possibly one or more time windows preceding or following the transition. These time windows form the "video segment of interest", which can then be displayed on the screen 140 for viewing by an operator 150 or stored in memory or even played back simultaneously with the video stream itself so as to allow the operator (e.g., a security guard) to see both live stream video and a video summary simultaneously, e.g., after a long break from his or her desk.

In some cases, only transitions to the A+ anomaly state may be of interest. As such, the video management system 100/110A can be configured to record video continuously, monitor the anomaly state of various time windows and, in response to an anomaly state of A+ for a given time window, pull out a recording that goes back a certain number of seconds before the start of the given time window, and display this recording for a certain number of seconds after the end of the given time window and/or until the monitoring of the recorded video reveals an anomaly state of A0 (the initially anomalous behavior of the scene becomes the "new normal") or A−.

The video management system 110/110A can be configured to create a "video summary" of the video data 135 by concatenating the "video segments of interest". One implementation is to summarize a video for when it is in anomaly state A+ or A− but ignoring when it is in anomaly state A0; however, other implementations are possible, depending on operational requirements.

Figure 7A:
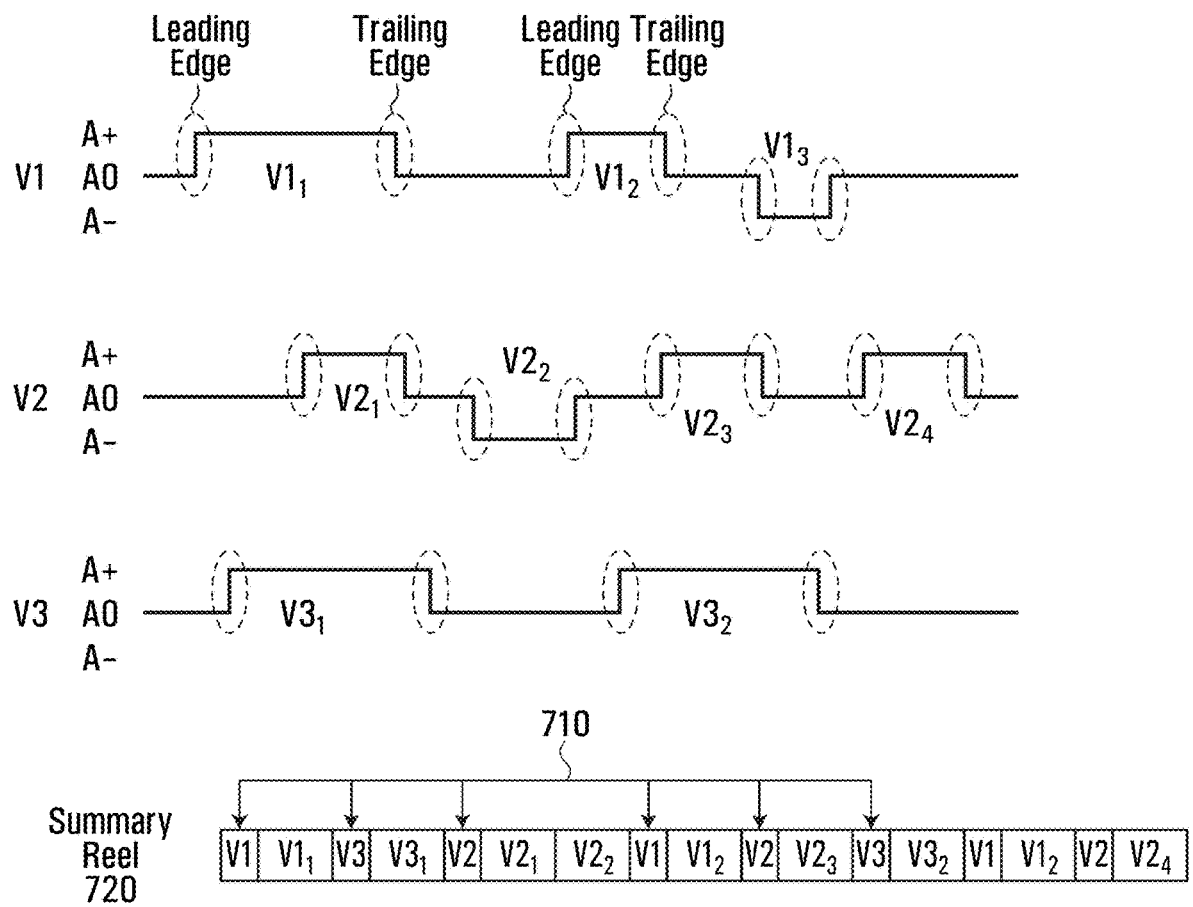
FIG. 7A is a timeline showing three video streams and FIG. 7B illustrates creation of a video summary, in accordance with non-limiting embodiments.

A non-limiting example is shown in FIG. 7A, where a video summary 720 includes a concatenation (stitching) of individual video segments of interest of a plurality of video streams, each video segment of interest having been extracted from either a video stream V1, a video stream V2 or a video stream V3. The video streams V1, V2, V3 may be from the same camera during different periods or from different cameras during the same time period or different time periods. As such, the video summary 720 may include video data from a single camera or video data from multiple cameras. Headers containing specially marked data may be generated by the video management system 110/110A and included in the video summary 720 so as to allow a receiver to determine the identity of the camera and its video stream (e.g., V1, V2, V3), as well as possibly the period of real time covered by that segment of interest. In an alternative embodiment, rather than creating a single video summary containing segments of interest from multiple video streams, individual video summaries could be created, each containing concatenated segments of interest of a corresponding one the video streams (e.g., V1, V2, V3).

Each video stream V1, V2, V3 is shown as being in one of three anomaly states A+, A0 or A−, at any given point in time. Video segments of interest extracted from the video streams V1, V2, V3 (forming part of the video summary 720) could be those time windows during which the corresponding video stream is in anomaly state A+ or A− (or, equivalently, not in anomaly state A0). In the illustrated embodiment, an attempt has been made at placing the video segments of interest more or less in chronological order, but this is not a requirement when creating the video summary 720. A data element 710 precedes each segment where there is a change in the source video stream for that video segment of interest, and this data element 710 may include metadata such as an indication of the source of the video stream of the subsequent video segment of interest.

In this way, the video streams V1, V2, V3 are condensed by the video management system 110/110A so as to keep only the time windows following an indication of a statistically abnormal change in motion (i.e., a statistically abnormal increase or a statistically abnormal decrease) until there has been a return to statistically non-abnormal (i.e., statistically normal) motion (anomaly state A0). Thus, the video management system 110/110A provides a programmatically compiled video summary 720 that may be stored by the video management system 110/110A in a separate memory. The condensed nature of the video summary 720 facilitates viewing by the operator 150 and has the potential to increase the relevance of what is presented to the operator 150.

In another embodiment, the video segments of interest extracted from the video streams V1, V2, V3 to form the video summary 720 could be those time windows during which the corresponding video stream has changed to anomaly state A+ or A− from anomaly state A0, including one or several time windows before and one or several time windows after the change.

Figure 7B:
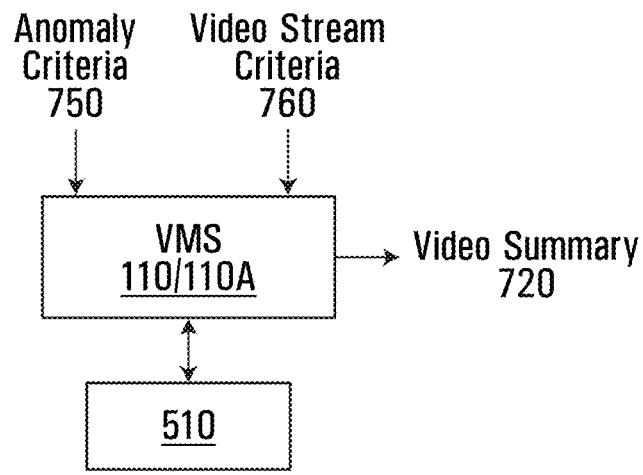

In a variant, the video management system 110/110A may query a database (e.g., database 510) for a subset of time windows in a desired time range and then the video summary may be created from the time windows (and images samples) within the desired time range. The desired time range may be a user input to the video management system 110/110A. In another variant, shown in FIG. 7B, the video management system 110/110A may be configured to allow the operator 150 to enter anomaly criteria 750, such as one or more desired anomaly states (A+, etc.) or anomaly state transitions (A0→A+, A−→A0, etc.), and to enter video stream criteria 760, such as the identity of one or more desired video streams (e.g., V1, V2, V3) stored in the database 510. The video management system 110/110A is configured to access the database 510 and apply the user-defined criteria 750 to the user-selected video streams 760 in order to create a video summary (e.g., video summary 720) which is then stored, displayed or otherwise output.

In a further variant, the video management system 110/110A may be configured to create a file containing ancillary data relating to the video data 135. Such ancillary data could include timestamps of "video segments of interest" in the video streams V1, V2, V3; for example, these could be segments containing time windows for which the anomaly state is indicative of a statistically abnormal change in motion (i.e., a statistically abnormal increase or a statistically abnormal decrease), along with the identity of the video stream (e.g., V1, V2, V3). This results in storing, as ancillary data, a video stream identifier and one or more time window identifiers indicative of the time windows (e.g., time stamps or packet IDs, etc.) in the corresponding video stream (identified by the video stream identifier) where abnormal motion can be found. In this way, the video streams V1, V2, V3 can be archived in one memory and the ancillary-data-containing file can be stored elsewhere (e.g., in another memory) and/or organized differently, without necessarily having to create or store a video summary.

Example 2: Composite Stream

Figure 5:
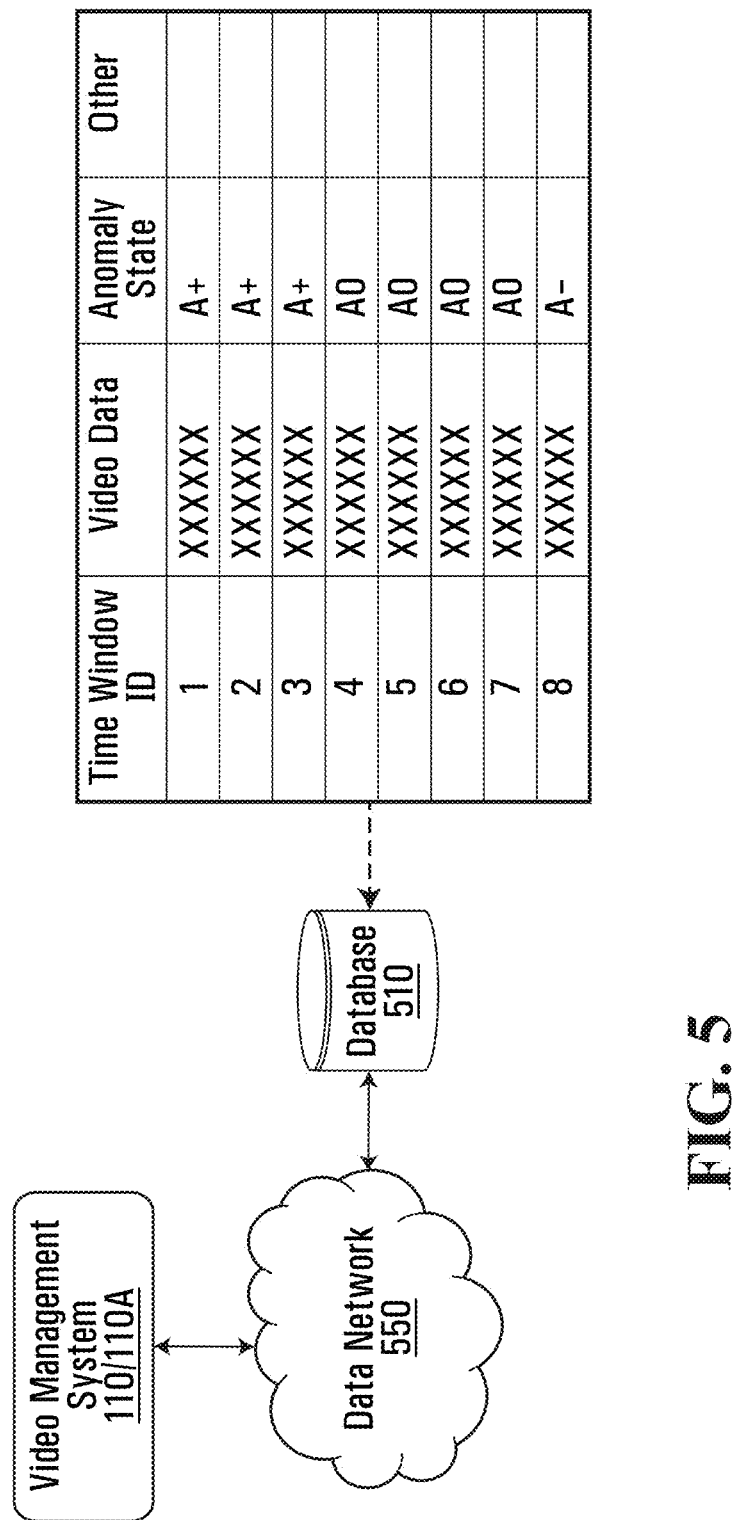
FIG. 5 is a block diagram of a video processing environment in which a database stores a composite stream broken down into time windows each including video data and non-video data, in accordance with a non-limiting embodiment.

The video management system 100/110A can be configured to (i) monitor the anomaly state of each time window of the video data 135, as provided by the anomaly state output stream 125, and (ii) insert this anomaly state into metadata for the video data for the appropriate time window. In this way, a "composite stream" can be provided, which includes metadata on top of raw video, and the composite data may be stored/archived. For example, with reference to FIG. 5, a database 510 stores a composite stream that is broken down into time windows, each identified by Frame ID. Each time window is associated with actual video data and metadata (such as the anomaly state). In some embodiments, additional metadata of a statistical nature can be added, such as p-values and various other statistical parameters. As such, in the aforementioned scenarios for creating a video summary, the video management system 110/110A may have access to the database 510 (e.g., over a data network 550 such as the internet) rather than separately accessing the video data 135 and the anomaly state output stream 125.

Example 3: Carousel

In some embodiments, the video management system 110/110A carries out a method whereby a first plurality of media streams is received, the anomaly state of each of the media streams is determined, and then a second plurality of media streams is selected from the first plurality of media streams based on (i) the anomaly state of each of the first plurality of media streams and/or (ii) changes/transitions in the anomaly state of each of the first plurality of media streams. The second plurality of media streams is displayed on a set of screens, windows or tiles.

In a specific non-limiting, there are multiple (e.g., tens or hundreds or thousands of) cameras (such as the camera 130) feeding into the video management system 110/110A. By utilizing the A+ anomaly states and transitions into and out of this anomaly state, a video monitoring screen page can be populated with a plurality of (e.g., 16) camera feeds which are managed (e.g., automatically carousel led (e.g. 1, 2, . . . , 16, 1, 2, . . . )) to show only "video segments of interest" associated with anomalous increases in motion (A+ anomaly states). As a new "anomaly up" state is detected, the camera on which this is occurring takes the place of the "oldest" camera on the carousel. This may facilitate the manner in which the operator 150 can monitor possibly hundreds or thousands of live video cameras, namely by emphasizing or only presenting to the operator 150 those cameras where anomalous increases motion have been found to occur (thus potentially allowing efficient identification of scenes that have escalated in activity). The same can be done for presenting or emphasizing to the operator 150 those cameras where anomalous decreases motion have been found to occur (thus potentially allowing the identification of cameras that have been tampered with, such as by covering the lens or having been oriented towards the sky).

Figure 11A:
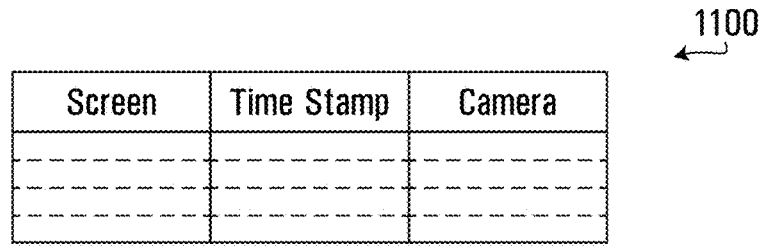
FIG. 11A shows a table conceptually illustrating an association between a set of cameras and a set of screens, in accordance with a non-limiting embodiment.

FIG. 11A conceptually illustrates the aforementioned carousel in the form of a table 1100 showing an instantaneous association between cameras and screens. Specifically, the table includes a set of records. Each record includes a "screen" entry (one of, say, 16 screens of the video monitoring screen page), a camera entry (the camera shown on the screen, which may be one of, say, 256 cameras) and a time stamp entry (the time when that screen began showing the camera with which it is currently associated). The number of screens and cameras is merely used as an example. In an actual implementation, any scenario where the number of screens is less than the number of cameras would work in a similar way.

Figure 11B:
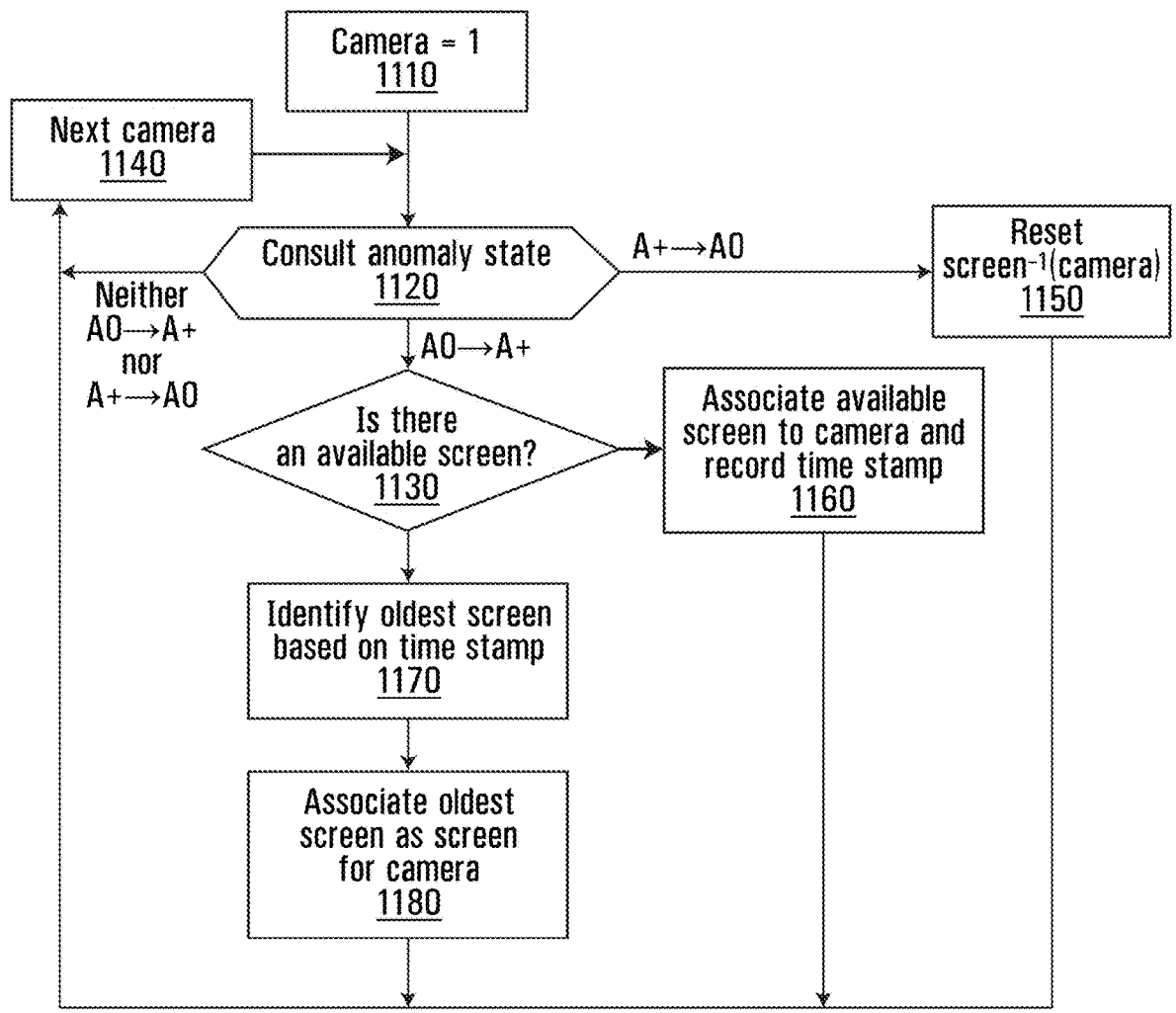
FIG. 11B is a flowchart of a carousel-type video display process that may be carried out by the video management system in accordance with a non-limiting embodiment.

FIG. 11B shows a flowchart for a process that may be carried out by the video management system 110/110A in the context of Example 2. The process may be carried out at every time window, e.g., each time there is a new time window and a new anomaly state for that time window is available for inspection. Three possible anomaly states are assumed for the purposes of this non-limiting example: A−, A+ and A0. Two variables are used, namely "camera" and "screen". The camera variable is cycled through; accordingly, at step 1100, the camera variable is initialized to its initial value, e.g., 1, to denote the "first" camera. At step 1120, the anomaly state of the time window is inspected (e.g., from the anomaly state output stream 125) and it is determined whether it has changed from A+ to A0 or vice versa. If neither is true, the next step is step 1140, whereby the camera variable is incremented so that the next camera is considered at step 1120.

If step 1120 reveals that, for a given camera, the anomaly state has changed from A+ to A0, then this means that there is in fact no longer a reason to show the video feed from the camera currently designated by the camera variable camera on the monitoring screen page. Accordingly, the next step is step 1150, where the screen that had been showing this video feed (denoted as screen$^{-1}$(camera)) is reset so as to make it "available" for the display of a video feeds from another camera. Practically speaking, this could result in clearing the camera entry from the row of the table 1100 associated with screen$^{-1}$(camera). The next step is step 1140 where the camera variable is incremented.

If it is revealed that the anomaly state has changed from A0 to A+, then the next step is step 1130, where it is verified whether there is an available screen, i.e., not all screens on the video screen monitoring page are occupied. If this is the case, the next step is step 1160, where an association is created between the available screen and the camera currently designated by the camera variable. Practically speaking, this could result in filling the camera entry for the row of the table 1100 belonging to the available screen, and also setting the corresponding time stamp entry to the current time stamp. The next step is step 1140 where the camera variable is incremented.

If, on the other hand, step 1130 reveals that there is no available screen, then it is envisaged that the "oldest" (e.g., longest-running) screen will start showing the video feed from camera currently designated by the camera variable. Accordingly, the next step is step 1170, where the oldest screen is identified based on the various time stamp entries in the table 1100. Thereafter, at step 1180, an association is created between this "oldest" screen and the camera currently designated by the camera variable. Practically speaking, this could result in filling the camera entry for the row of the table 1100 belonging to the "oldest" screen (which is now of course no longer considered the oldest or longest-running screen), and also setting the corresponding time stamp entry to the current time stamp. The next step is step 1140 where the camera variable is incremented.

In other embodiments, a different criterion (one other than age) can be used for selecting which screen should be chosen to display the video feed from a camera that exhibits a new change in anomaly state from A0 to A+.

Example 4: Media Summary Based on User-Definable Criteria

Figure 12:
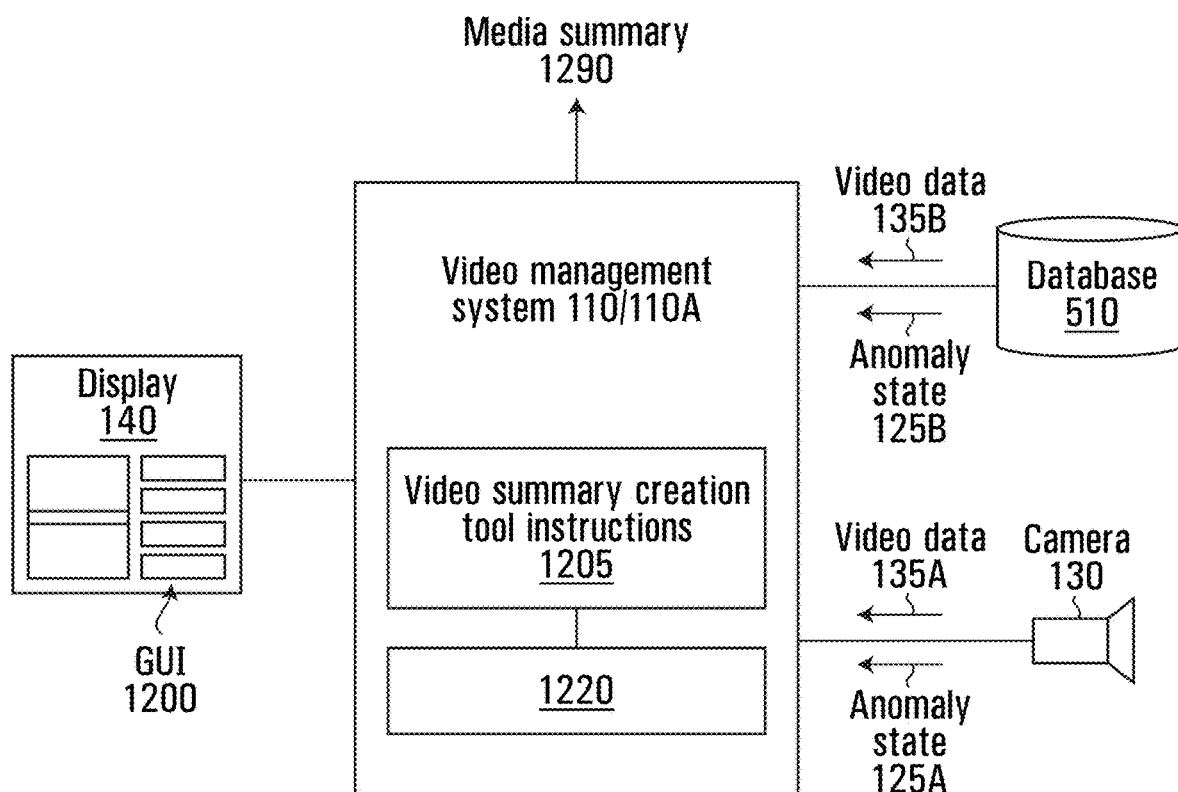
FIG. 12 is a block diagram depicting, inter alia, a memory that stores instructions for carrying out a video summary creation tool, in accordance with a non-limiting embodiment.

In this example, and with reference to FIG. 12, the video management system 110/110A implements a GUI-based media summary creation tool, which can be the result of a processor 1220 of the video management system 110/110A executing computer-readable instructions (media summary creation tool instructions 1205). The GUI-based media summary creation tool receives input from the operator 150 (e.g., via a graphical user interface 1200 on the display 140). The GUI-based media summary creation tool also receives video data and anomaly state data. The video data may include video data 135A for one or several cameras obtained from memory (e.g., database 510 or some other memory that may be internal to the video management system 110/110A) and/or video data 135B constituting a live feed from one or multiple cameras 130. The anomaly state data may be provided in separate anomaly state output streams (e.g., stream 125A, 125B) or may be conveyed together with the video data 135A, 135B itself (e.g., in the form of metadata).

The GUI-based media summary creation tool is configured to process the video data from one or multiple cameras based on (i) the anomaly state of each time window of the video data, (ii) the operator input and (iii) possible additional metadata associated with each time window, thereby to result in curated video and event data. The GUI-based media summary creation tool is then configured carry out playback of the curated video and event data via the GUI 1200 on the display 140. The GUI-based media summary creation tool is also configured to receive additional input from the operator 150 via the GUI 1200 during playback of the curated video and event data and to produce a media summary 1290 based on such additional input.

Figure 13:
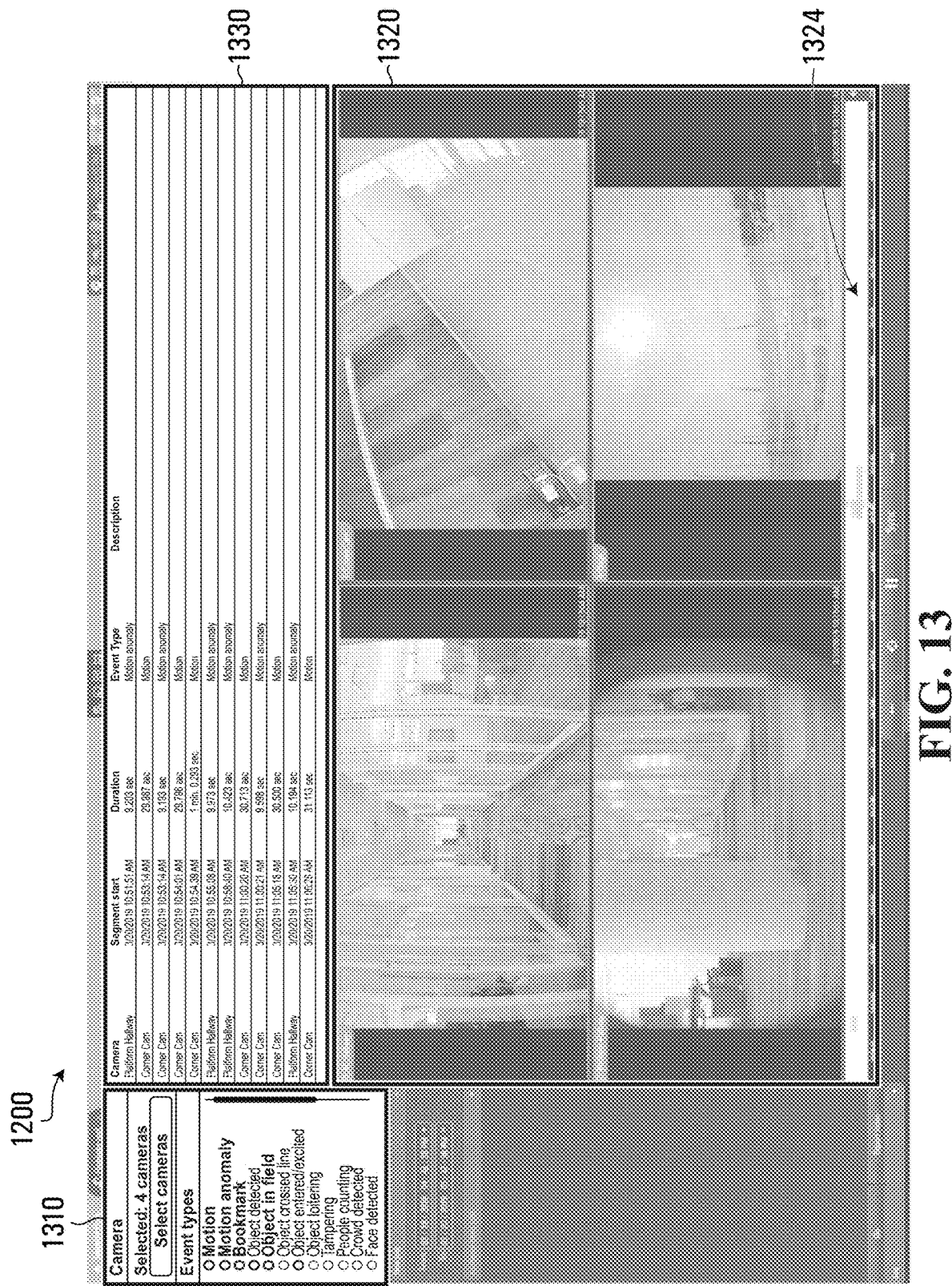
FIG. 13 graphical user interface presented by the video summary creation tool, in accordance with a non-limiting embodiment.

In a non-limiting embodiment, and with reference to FIG. 13, there is shown a GUI 1200 presented by the GUI-based media summary creation tool and including a selection window 1310, a playback window and an event list window 1330. The GUI-based media summary creation tool will now be described in terms of selection of system parameters & event criteria, playback of curated video & event data, and creation of the media summary 1290.

a) Selection of System Parameters & Event Criteria

The selection window 1310 allows operator interaction with the GUI-based media summary creation tool. The selection window 1310 presents one or more system parameters and event criteria that the operator 150 may select (e.g., with a mouse or by using the display 140 if implemented as a touch screen).

A wide variety of selectable system parameters and event criteria may be presented by the GUI-based media summary creation tool in the selection window 1310 of the GUI 1200. Non-limiting examples of system parameters may include:

- A desired or minimum or maximum number of "segments of interest" to be included in the eventually created media summary 1290 covering a given period of real time (e.g., include no less than 2 and no more than 10 segments of interest in the media summary covering 12:00 PM to 3:00 PM)
- Absolute duration parameters (e.g., a desired or minimum or maximum overall length) of the eventually created media summary 1290 (e.g., length of the media summary=2 minutes)
- Relative duration parameters (e.g., a desired or minimum or maximum overall length) of the eventually created media summary 1290 covering a given period of real time (e.g., desired length of the media summary covering 6:00 PM to 7:00 PM=2 minutes)
- A desired or maximum or minimum duration of a segment of interest to qualify it for inclusion in the eventually created media summary 1290
- Threshold sensitivity (e.g., the values of A and B in the above-described calculation of p-values): this may have an impact on the frequency of anomaly state transitions;
- Etc.

Non-limiting examples of event criteria may include video-based event criteria. Evaluating whether a video data associated with a given camera meets these criteria is determined by processing the video data. Such criteria may include, for example:

- Whether the video data associated with a particular camera is in an anomaly state(s) of interest (e.g., one or more of A+, A−, A0, . . . )
- Whether the anomaly state of the video data associated with a particular camera undergoes a transition(s) of interest (e.g., A0→A+, A++→A+, . . . )
- Whether the video data associated with a particular camera includes contextual metadata of interest (e.g., presence of a cat, presence of a dog, presence of a cat and dog, presence of no animal)
- Combinations of statistical and non-statistical criteria (e.g., ((("A+" OR "A−") AND "other criterion 1") OR "other criterion 2"))
- Filters (e.g., only low-light/high-light scenes, only scenes where motion lasts more/less than 30 seconds, etc.)
- Whether the video data associated with a particular camera contains motion, including motion above or below a particular threshold level of motion
- Whether the video data associated with a particular camera contains a face, including a recognized face from a database or absence from the database, or a minimum number of faces simultaneously in a particular image sample or time window
- Whether the video data associated with a particular camera contains a particular object or object class;
- Whether the video data associated with a particular camera contains a license plate, e.g., a license plate whose number is listed (or not listed) in a given database stored in memory or online; etc.

Non-limiting examples of event criteria may also include non-video-based event criteria that is associated with a given camera, which may ultimately trigger display of the video data associated with the given camera, such as:

- Events based on access control inputs, for example detected badging events (such as access grants, access denials, etc.) in an area associated with a particular camera;
- Events based on vehicle data, for example detected bus or train arriving at a station in an area associated with a particular camera
- Events based on building conditions, for example smoke alarm, fire alarm, forced door entry, etc
- Events based on weather conditions (e.g., temperature or humidity reaching a certain upper or lower threshold)
- Etc.

In some embodiments, the system parameters and the event criteria may be provided in the form of one or more checklists, e.g., in the selection window 1310. In other embodiments, one or more of the system parameters or event criteria may be associated with a pre-defined set of possible values that may be presented in a certain way (e.g., drop-down menu, radio button, . . . ) and from which the operator 150 may make a selection. In other embodiments, one or more of the selectable system parameters or event criteria may be entered by the operator 150 in a free-form manner.

Other more conventional system parameters (e.g., "resolution", "input language") and event criteria can also be made available to the operator 150. Of course, operator input is not restricted to be entered via the selection window 1310 and instead may be entered by another mechanism, such as via a different window using a keyboard or mouse, for example.

b) Playback of Curated Video & Event Data

In the present non-limiting embodiment, the GUI-based media summary creation tool processes (i) the video streams from the cameras 130 and/or the database 510 and (ii) the anomaly state of each video stream (which may be in the video data 135A, 1358 or in a separate stream 125A, 125B) in accordance with the selected system parameters and event criteria in order to create (i) curated video streams that are played back in the playback window 1320; and (ii) a running list of events that is presented in the event list window 1330. This provides a rough draft video summary that the operator can then evaluate for suitability.

With reference to FIG. 13, the playback window 1320 is shown to include one or more tiles of curated video (i.e., video data that is in compliance with the selected system parameters and event criteria). The number of tiles may correspond to the total number of cameras being monitored by the video management system 110/110A, but this need not be the case. A timestamp 1322 may also be shown for one or more of the tiles, which could be representative of the time at which the currently displayed frame of video data was captured, which may not be the current system time. A progress bar 1324 may be provided for one or more of the tiles in order to represent the time within the curated video and the corresponding time in the original video data 135. In case the video data does not match the system parameters or the event criteria, the playback window 1320 may be left blank or dark.

In other embodiments, where there are more cameras than displayable tiles, the GUI-based media summary creation tool may provide a mechanism (e.g., a management algorithm) for displaying the curated video for each camera sequentially. For example, assume there is only one tile available. Then, for a given overall period of time X to Y, the tile may display the curated video for camera 1 (covering time X to Y), followed by the curated video for camera 2 (covering time X to Y), and so on. This cycling through the different cameras works well where, on average, the total length of all curated video (for all cameras sharing the same tile) is less than the elapsed real time between time X and time Y, otherwise more severely curated video may be required. This can be achieved by selecting more stringent system parameters or event criteria.

In another embodiment, curated video from multiple cameras can be toggled and displayed on the same tile according to order of event occurrence. In other words, as soon as a new event is detected in the video data from camera X, the tile displays video from camera X, until an event is detected in the video from camera Y, at which point the tile displays the video from camera Y, and so on.

With continued reference to FIG. 13, the event list window 1330 is shown to include a running list of events detected in the video from one or more cameras. This list may be made sortable, exportable and transmittable, by the GUI-based media summary creation tool. The running list may include a camera identifier, a time at which the detected event started, a duration of the event, a type of the event and a description if applicable. Generally speaking the event list conveys those occurrences where an event matching the event criteria is found in the video stream being processed.

In some embodiments, cameras may be associated with geographic locations (known ahead of time or obtainable from the metadata). In this case, the geographic location of the camera may be added to the running list of events displayed in the event list window 1330. In another embodiment, a map window (not shown) may include a map that shows locations associated with a plurality of cameras, and each time an event that matches the event criteria is detected by the system, a location on the map in the map window is emphasized (e.g., flashes, changes color, etc.). The map may provide a link to the video data, allowing the operator to touch or click on a location and cause the video data associated with that location to be displayed in a corresponding tile in the playback window 1320.

For example, if one of the event criteria is a transition from A0 to A+ anomaly state, and if this transition is detected on the video data from camera 5, then an icon positioned at the location of camera 5 on the map n the map widow may be caused to flash or light up. The associated video data may be played back as curated video in the playback window 1320.

Those skilled in the art will appreciate that non-video event data may also be processed by the GUI-based media summary creation tool. For example, non-video event data may include data obtained from access control inputs (badging IDs), weather data, vehicle data (bus or train arriving in station), smoke/fire alarm data, and the like. Some of the non-video event data may be associated with a respective geographic location. As such, the non-video event data can be associated with an icon on a map information. The GUI-based media summary creation tool may be configured to synchronize the video data with the non-video event data so as to display, in the display window 1320, images or video from those cameras closest to the non-camera events.

In another embodiment, a plurality of video streams associated with a plurality of cameras is obtained and the anomaly state associated with each of the video streams is determined, e.g., on a time window by time window basis, either by computing it or in an accompanying anomaly state output stream. Based on the one or more criteria, occurrences in each video stream are identified. These occurrences indicate that the one or more criteria are met by the anomaly state. An action is taking involving these occurrences could be displaying a map of icons corresponding to the cameras (e.g., at their locations) and then emphasizing a particular one of the camera icons in response to determining one of the aforementioned occurrences, i.e., in the video stream from the camera corresponding to the particular one of the icons.

It is also noted that the GUI-based media summary creation tool may be configured to allow the operator 150 to change system parameters and event criteria during playback. For example, if the operator lowers the sensitivity, the video shown in the playback window 1320 would show a greater number of highlights, and then the operator can choose to return to a higher sensitivity at a later point in time. Thus, through the GUI 1200, a user is able to dynamically change the event criteria.

c) Creation of the Media Summary 1290

The media summary 1290 may take on many embodiments. In one example, the media summary 1290 may simply be a concatenation of the curated video shown in the tiles of the playback window 1320, and encoded in a file.

In another example, the media summary 1290 may include frames of the curated video shown in the tiles of the playback window 1320, together with occasional frames of video from the original video data 135 that did not meet the event criteria. These occasional frames could represent a decimated/accelerated version (e.g., every Xth frame) of the video not considered to meet the event criteria yet still useful to provide context to the operator 150. This would allow the operator 150 to view all segments of interest at their normal rate and to view video that is between segments of interest at an accelerated rate. This would give the operator at least some contextual sense of what is happening between adjacent video segments of interest. It is also envisaged that the segments of interest could also be accelerated, but at a different rate than the video data between segments of interest.

In another example, the media summary 1290 may include the curated video shown in the tiles of the playback window 1320, together with the associated event data as displayed in the event list window 1330.

In another example, the media summary 1290 may include the curated video shown in the tiles of the playback window 1320, together with, for each frame of video data, a snapshot or image of the progress bar that accompanies that frame in the playback window 1320.

In another example, the media summary 1290 may not include any video data, but may simply include the event list.

In another example, the media summary 1290 may include a progress bar that has multiple entries along the progress bar to show the occurrence of events over time. The entries could be color coded to different types of events. This allows the viewer to gain an overall sense of the behavior of a time segment of a particular camera without having to scroll through video. Of course, the associated video data could be made available and/or linked to the data in the media summary 1290.

Those of skill in the art will appreciate that there are other numerous other feasible examples of the media summary 1290, which could range from data that includes only a video summary to data element that includes a video summary and other information to a data that does not include video at all.

The GUI-based media summary creation tool may include various "manual" functions for the operator 150 to have control over creation of the media summary 1290 being created for dissemination or further investigation (and stored in memory). Such manual functions may include, for example:

Playback tool with the GUI 1200 to allow the operator 150 to select a camera view (e.g. from the split screen) either to enlarge, or to keep in the media summary, or to discard.

Add extra time before or after highlights forming part of the media summary.

Crop video and digitally zoom.

Other edits and tweaks.

d) Variants

In some embodiments, the GUI-based media summary selection tool may automatically pre-select default values of one or more of the system parameters or event criteria, which are then modified by the operator 150. For example, the "sensitivity" system parameter (e.g., the values of the A and B thresholds in the calculation of p-values) may be a variable parameters that is selected based on, e.g., the length of the resulting curated video summary, or on a ratio of the length of the resulting curated video summary relative to the overall duration of the video data in a given period of time. This ratio can be referred to as a compression ratio.

As such, the default values of A and B may be selected so as to give a total duration of, say between 30 seconds and 2 minutes, or a compression ratio of, say, between 5% and 10%. This would result in an initial attempt at finding the most relevant 30-120 seconds or 5%-10% of the video data. However, as optimal values of A and B may depend on the actual content of the video data (depending on the type of application), the values of A and B may be further adjusted by the operator 150 using the GUI-based media summary creation tool.

In the example case where one of the system parameters is a duration parameter (e.g., a maximum duration of the eventually created media summary 1290), the GUI-based media summary creation tool may adjust various other system parameters or event criteria to meet the duration criteria. As discussed above, this could include adjusting the sensitivity (e.g., thresholds for p-values) until the ensuing media summary has the desired duration. Alternatively or in addition, this could include adjusting event criteria in an application-dependent fashion. For example, in a building security application, if the media summary resulting from the selected sensitivity would be too long and needs curtailing, the GUI-based media summary creation tool may adjust selection of the segments of interest to include only those that are temporally in the vicinity (a few frames before, during and a few frames after) of a badging event or, if still too long, only those segments of interest temporally in the vicinity of a denial of entry. In some embodiments, the GUI-based media summary creation tool does not determine the anomaly state of the video streams at all. As such, the aforementioned example may apply but without the notion of "sensitivity" impacting the manner in which the media summary 1290 is created. The video-based and non-video-based event criteria may be modified by the user or by the system itself in order to achieve the required absolute or relative duration parameters.

As such, there has been described a multi-step adjustment process for determining the values of the sensitivity and other event criteria, including an initial selection computed algorithmically by the system 110/110A, followed by a second adjustment that is system-driven or user-based.

Those skilled in the art will appreciate that in some embodiments, creation and/or display of a media summary may be further influenced by characteristics other than operator-selected criteria. In particular, this could include the ID of the operator and his/her associated user type or security level, for example. In this case, the media summary that is created or displayed may differ depending on the user type of the operator. For example, in a corporation where the video data includes metadata indicative of the department where the video is being filmed, the media summary that is suitable for viewing by a security guard may include only video segments associated with anomalous motion, whereas the media summary suitable for viewing by the manager of the department may include all motion, anomalous or not, but restricted to having taken place in that department.

Those of skill in the art will appreciate that some embodiments may provide for a multi-camera implementation. In such a case, the same selected criteria used for creating the media summaries may be applied across multiple cameras, or individualized criteria may be selected on a per-camera basis.

Example 5: Analysis of Anomaly States

The video management system 110/110A may be further configured to process the video data 135 and the metadata associated with the video data 135.

For example, in response to operator input, the video management system 110/110A may be configured to process the anomaly state output stream 125 which, it is recalled with reference to FIG. 10, can include a stream of data sets 125A, 125B, 125C, . . . , each data set including an ID ("Time Window ID") of a given time window of the video data 135 and the anomaly state for the given time window.

In one example, based on the anomaly state of each time window, the video management system 110/110A may determine the amount of time (relative or absolute) that the video data 135 is in a particular anomaly state. This can be converted into a percentage of time during which the video in anomaly state A+ or A− (which may be referred to as a "compression ratio"). The compression ratio may give the operator 150 a quick and informative overview of the state of the detection algorithm as well as possibly information about the state of the scene that the camera is recording.

In another example, the GUI-based media summary creation tool may be configured to provide the user with an opportunity to select the compression ratio. In response, the video management system 110/110A selects the A and B thresholds for the A+ and A− anomaly states so that the percentage of time during which the video was in anomaly state A+ or A− matches the user-selected compression ratio. The user may similarly be given the opportunity to select a range of compression ratios and the video management system 110/110A selects the A and B thresholds for the A+ and A− anomaly states so that the percentage of time during which the video was in anomaly state A+ or A− (i.e., the compression ratio) matches the user-selected compression ratio.

In another example, based on the anomaly state of each time window, the video management system 110/110A may determine the number, frequency, and time of transitions between anomaly states. As such, looking at how often a video stream transitions from, say, anomaly state A0 to anomaly state A+ and similarly from anomaly state A0 to anomaly state A− would give some indication of how much "variability" is present in the recorded scene. It also could give the operator 150 an estimate on what time of day needs to be most investigated, for example. In this context, the video management system may output a histogram over the frequency of state transitions per the time period of a day.

In some embodiments, processing of the anomaly states may allow the video management system 110/110A to select default values of one or more of the selectable system parameters and event criteria (see description of the GUI-based media summary creation tool in Section 4 above). For example, consider possible anomaly states of A--, A-, A0, A+ and A++. If the ratio of the number of time windows in anomaly state A+ or A++ to the total number of time windows is X but the ratio of the number of time windows in anomaly state A++ to the total number of time windows is Y, where Y is within a pre-determined range (e.g., from 0% to 20%), then the GUI-based media summary creation tool may be configured to consider as curated video only those time windows associated with an anomaly state of A++. Of course, after such automated initial selection, the operator 150 may be free to select with greater specificity which anomaly states are monitored for the purposes of creating the media summary.

Example 6: Mappable Event Data

Figure 14A:
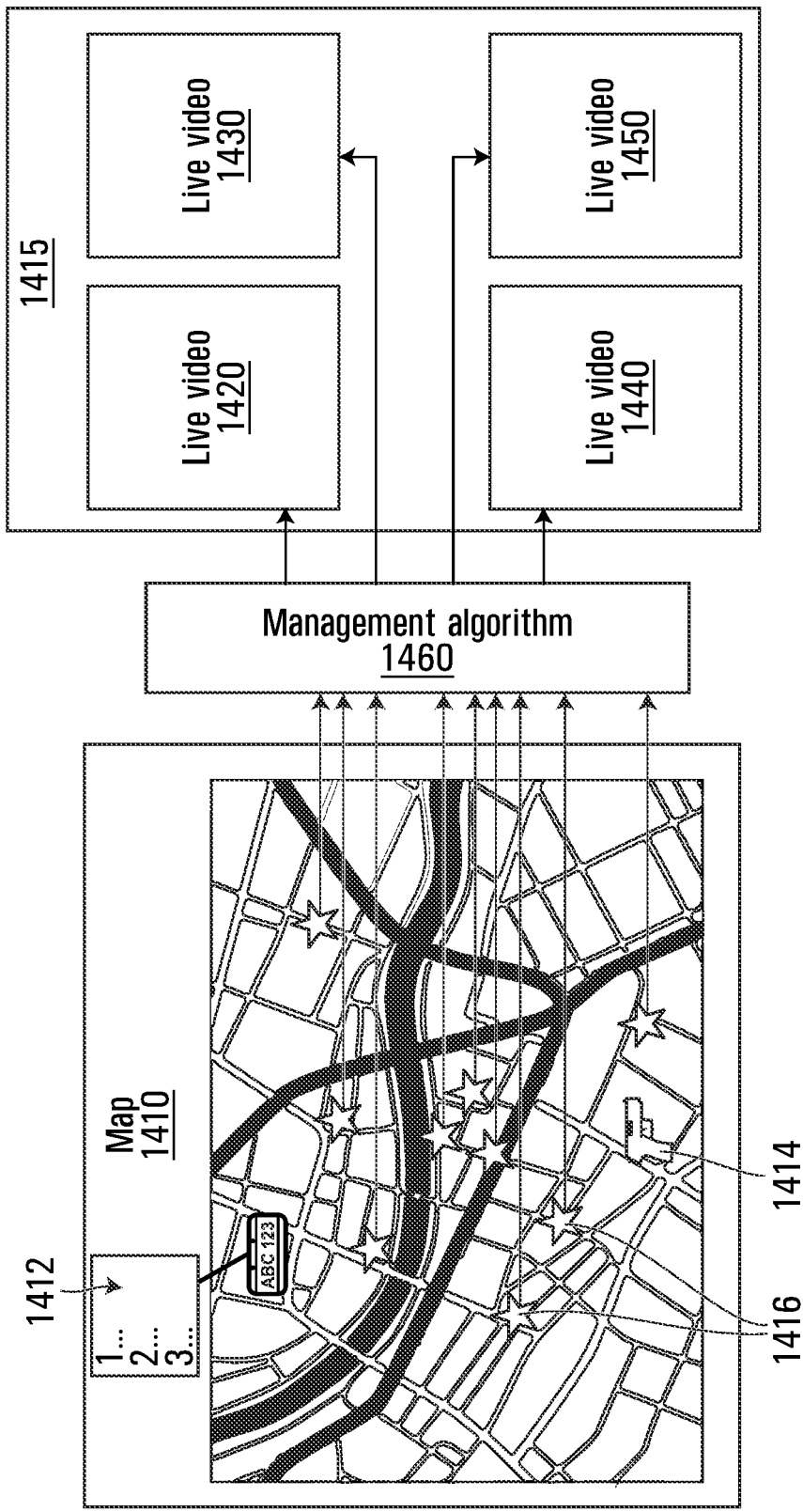
FIGS. 14A to 14C conceptually show various states of a security application implemented by the video management system, in accordance with a non-limiting embodiment.
Figure 14B:
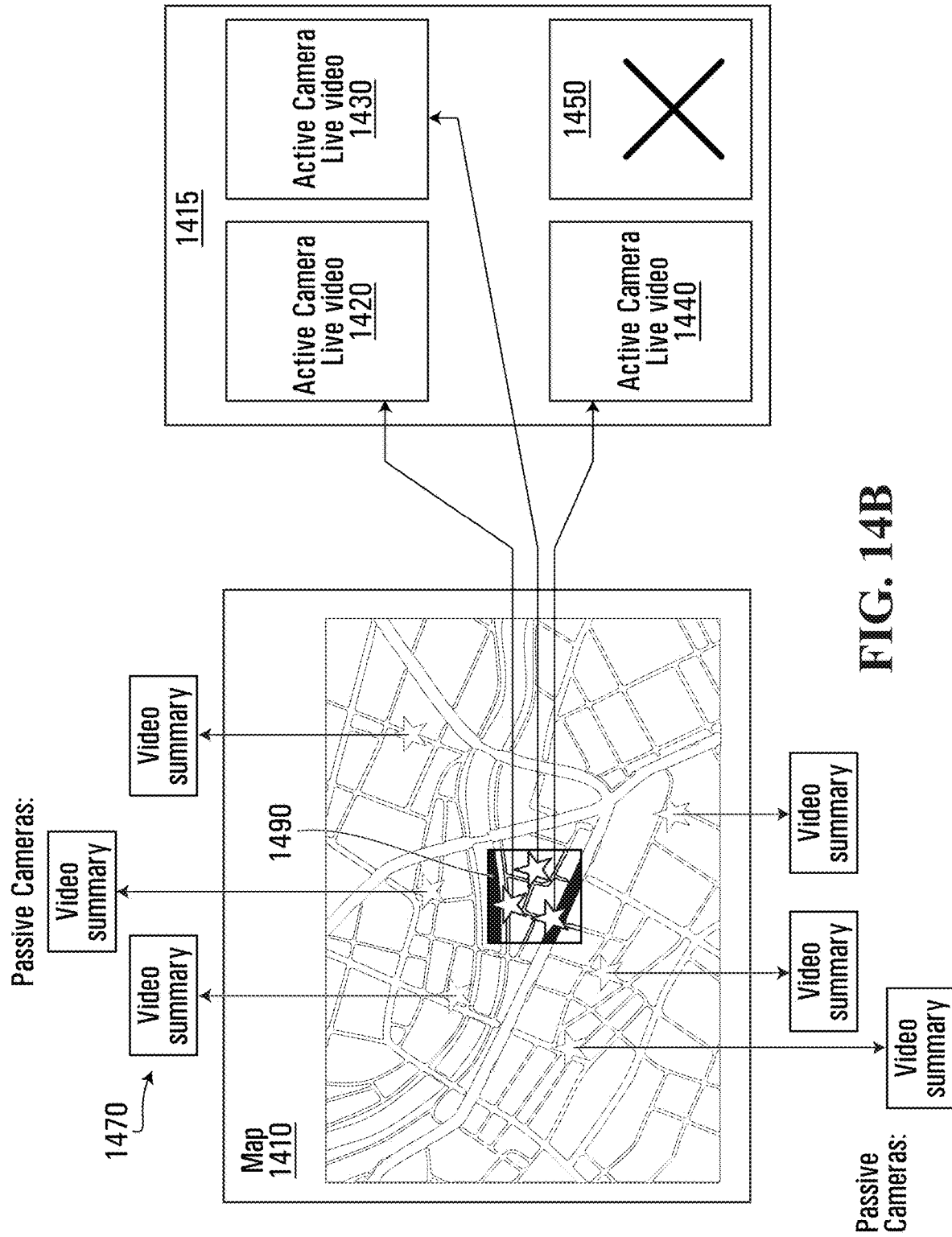
Figure 14C:
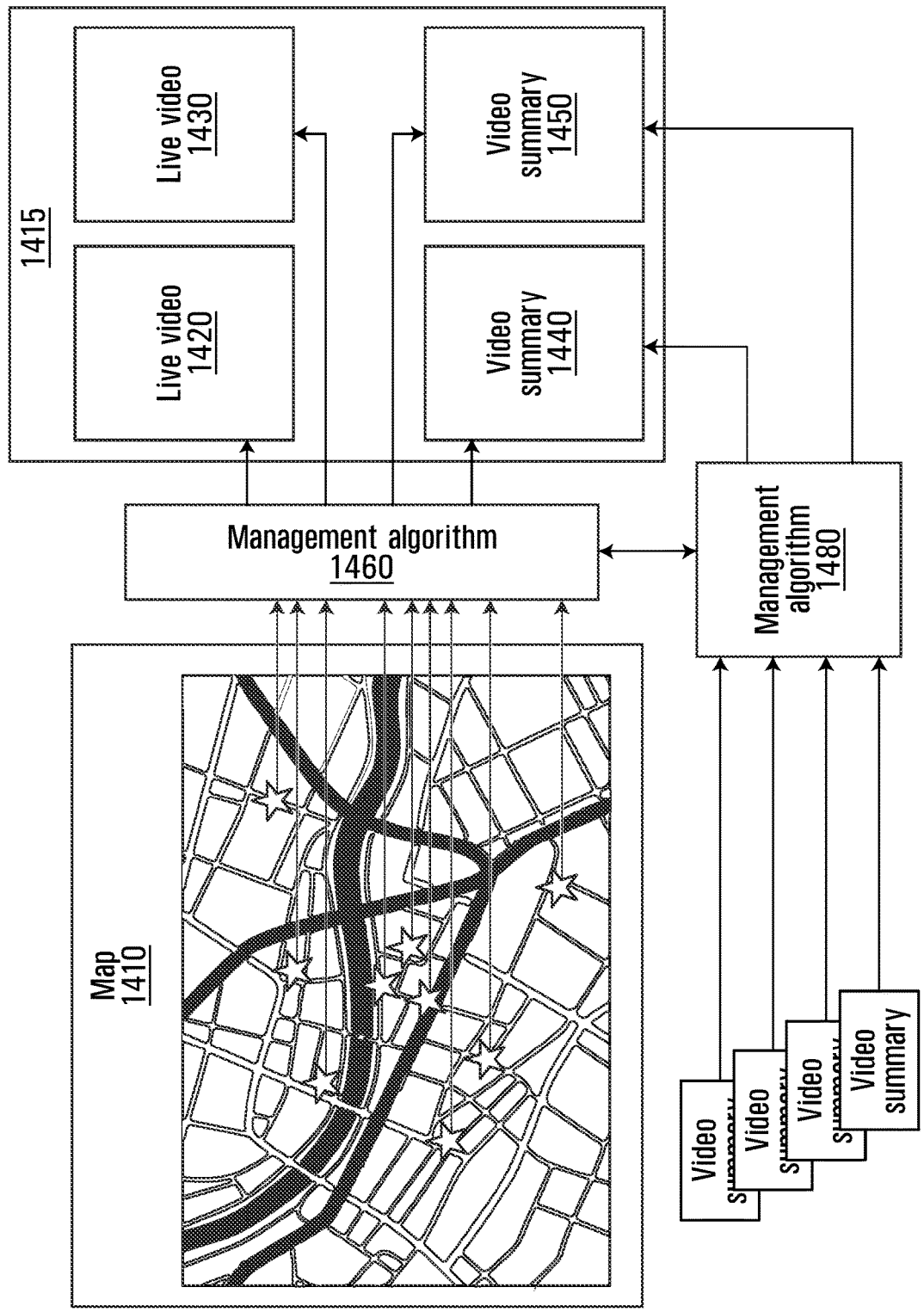

In another non-limiting example embodiment, shown with reference to FIGS. 14A-14C, the video management system 110/110A implements a security application. The security application is configured to gather georeferenced event data (e.g. door openings, camera motion, 911 calls (for a city-wide system), license plate reads, license plate hit-list hits, motion detection, etc. . . . ). The georeferenced event data may be in the form of multiple event data streams from multiple sources, including cameras and non-camera sensors (e.g., 911 center, license plate readers, building motion detectors, . . . ).

As such, it will be appreciated that some of the event data streams include video data and others do not.

Each of the event data streams may be associated with a geographic location, which may be fixed or variable. In some cases, the geographic location associated with an event data stream may be a fixed geographic location where the camera or non-camera sensor for that event data stream is known to be placed. In such cases, the geographic location may be determined by consulting a database 510 that associates cameras and non-cameras sensors with geographic locations. In other cases (e.g., 911 calls), the geographic location associated with an event data stream is a variable information element that is provided with the event data itself. Such may be the case with an event data stream from a 911 center which forwards data regarding 911 calls, including the nature of the call and the location where each call originated.

The security application is configured to provide a display that represents various event data streams associated with geographic locations within a region of interest. In a non-limiting embodiment, the screen may include several sections, including a map 1410 and a display window 1415. The map 1410 and the display window 1415 share the same display screen so as to be simultaneously displayed on the display 140.

The map 1410 may be used to represent various data, particularly non-video data. This could include icons representing event data streams from non-camera sensors. For instance, a license plate detector operating at location XYZ may be represented on the map 1410 by a license plate graphic 1412 containing the names of the owners of the last N vehicles whose license plates were detected by the license plate reader. In another example, in the case of an event data stream from a 911 center indicating a reported gunshot at a particular address within the region of interest, then this may be shown by placing a gun icon 1414 on the map 1410 in the vicinity of the particular address. In addition, the map 1410 may include icons (shown as stars 1416) placed on the map to indicate where those cameras are physically located.

The display window 1415 may be used to simultaneously present video data from one or more cameras, including those in the region of interest. In some embodiments, portions of the display window 1415 may be activated by contacting or selecting portions of the map 1410. In some embodiments, the display window 1415 includes a number of sub-windows 1420, 1430, 1440, 1450.

Figure 16:
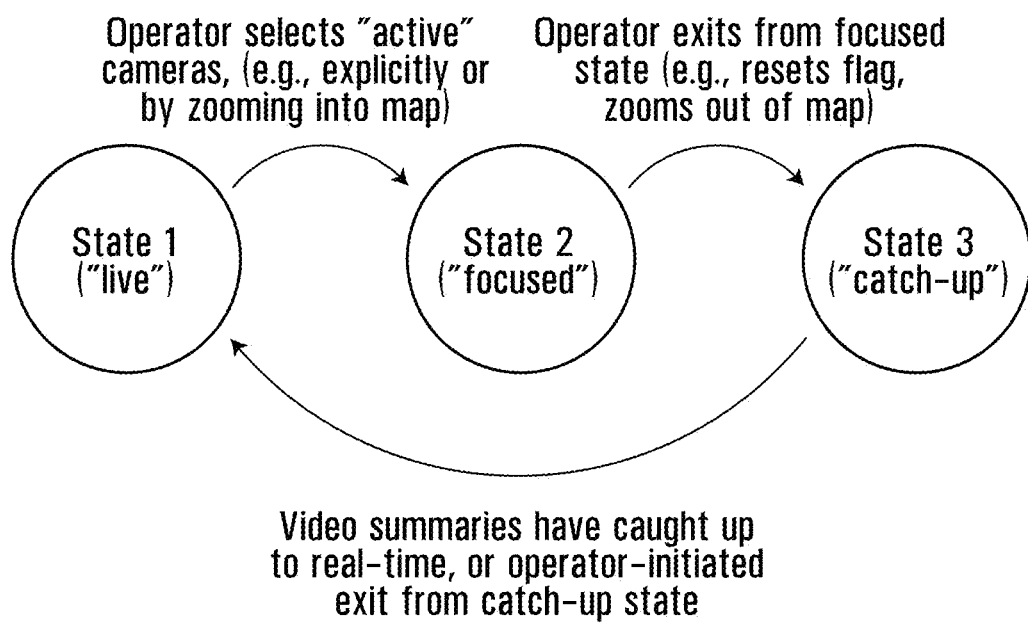
FIG. 16 illustrates a finite state machine that may be used to represent state changes in the security application, in accordance with a non-limiting embodiment.

In some embodiments, the security application can be viewed as being in one of a plurality of fundamental states at any given time: State 1 ("live"), State 2 ("focused") and State 3 ("catch-up"). Transitions can occur between states, as now described in greater detail with additional reference to FIG. 16.

In State 1 ("live"), the security application processes the event data streams and populates the region of interest on the map 1410 with indications of events in the event data streams and locations of cameras. In addition, video data from the cameras in the region of interest is presented in the display window 1415. In the case where there are more cameras in the region of interest than there are cameras that may be simultaneously presented in the display window, a camera management/multiplexing algorithm 1460 (such as a carousel) for presenting a greater number of cameras on a smaller number of display screens may be carried out. Other multiplexing techniques besides carouselling can be used.

The security application may be configured so as to provide the operator 150 with an ability to select one or more cameras for more focused viewing. This selection process may have the effect of labeling the selected cameras as "active", with the others being labeled as "passive", and results in the security application transitioning from State 1 ("live") to State 2 ("focused").

For instance, one way to transition from State 1 to State 2 is for the operator 150 to explicitly identify (e.g., by tapping the map 1410 or using a keyboard or mouse) the cameras that he or she wishes to view in the display window 1415. The selected cameras are labeled as "active" and their presentation in the display window overrides the carouseling or other multiplexing algorithm 1460 that may have been implemented by the security application in State 1. Other (non-selected) cameras are labeled as "passive". A resettable "focused mode" flag may be set and presented to the operator 150 to indicate that there has been an override of the cameras being shown in the display window 1415 with only active cameras. In other words, with the "focused mode" flag being set, passive cameras are not being presented in the display window 1415. This implies that there exists a possibility that activity of interest may be occurring elsewhere in the region of interest (and caught by a passive camera) without the operator 150 being given an opportunity to see it unfold.

Another way to transition from State 1 to State 2 is for the operator 150 to zoom in on a sub-region 1490 of the region of interest. To achieve this, the operator 150 may zoom in using a pair of fingers (as with zooming into a picture on a smart phone) or the operator 150 may use a mouse, keyboard, microphone or other input device to achieve the required zoom onto the sub-region 1490. This has the effect of automatically labeling those cameras in the sub-region 1490 of the region of interest 1408 as "active", with the remaining ones (i.e., those in the region of interest but outside the sub-region 1490) being labeled as "passive". If the number of cameras in the sub-region 1490 is less than or equal to the number of sub-windows or cameras that can be shown in the display window 1415 (e.g., 3 in the sub-region 1490 versus 4 in the display window 1415, as seen in FIG. 14B), then no carouselling or multiplexing is needed in order to present all active cameras in the display window 1415.

Yet another way to transition from State 1 to State 2 is for the operator 150 to pause live camera viewing and use the security application for other functionalities. A pause functionality may be provided for this purpose. In this case, the number of active cameras is zero, and all cameras in the region of interest are considered passive.

Upon transitioning to State 2, the security application may be configured to record the time (HH:MM:SS) of the transition and store it in memory. Also, because there exists a possibility that activity of interest may be caught by a passive camera without the operator 150 being given an opportunity to see it unfold, the security application compiles a video summary of the video data associated with each of the passive cameras. The compiling of video summaries may begin with video data as of the time of the transition to State 2. It should be appreciated that video summaries can be created based not only on anomalous motion detected in the video data captured by the passive cameras but also by making links with other metadata and/or timelined events, such as detected gunshots, 911 calls about gunshots, speeding cars, etc. In fact, the operator 150 may be provided with an opportunity to specify in detail the criteria needed to be met by the video data retained as a video summary.

As such, during the time that the security application is in State 2 ("focused"), the passive cameras in the region of interest are picking up activity that may be potentially of interest (e.g., anomalous motion), and for which video summaries are being created. However, this activity of potential interest caught by the passive cameras will not be seen by the operator, as he or she is being presented the video data from the active cameras in the display window 1415. In order to allow the operator to "catch up" on events that may have occurred during the operator's focused attention on the active cameras and caught by one or more of the passive cameras, the operator 150 may transition the security application from State 2 ("focused") to State 3 ("catch up").

There are numerous ways in which the security application may transition from State 2 to State 3, depending on the mechanism used to transition from State 1 to State 2. For example, in the case where a resettable "focused mode" flag had been set to indicate that the security application is in State 2, one way to transition from State 2 to State 3 is for the operator 150 to reset the "focused mode" flag. Alternatively, in the case where the operator 150 zoomed in to sub-region 1490 of the map 1410 to effect the transition from State 1 to State 2, the operator 150 may zoom out of the sub-region 1490, thus transitioning into State 3. Also, in the case where the operator 150 may have transitioned to State 2 by pausing live camera viewing, the operator may provide a command to resume live camera viewing.

Once the security application is in State 3 (see FIG. 14C), the video summaries from the "passive" cameras are played back in the display window 1415. If there are more cameras for which there is an available video summary (i.e., formerly passive cameras) than there are sub-windows in the display window 1415 for simultaneous display, then the security application may apply a management algorithm 1480 to select how to display the video summaries. In a non-limiting embodiment, this may result in the video summaries being displayed in sequence, one after the other. The video summaries may be played back from as far back as the time when the transition to State 2 occurred or was recorded. It should be appreciated that the video summaries represent time from the past and not present time. As such, during playback of the video summary from a particular camera, a time bar may show the playback time (with or without a reference to the present time) in order to inform the operator 150 as to what time of day he or she is looking at, and an icon may be emphasized on the map 1410, corresponding to the geographic location of the particular camera, thereby to assist the operator 150 in knowing what part of the region of interest he or she is looking at.

It should be appreciated that with the security application being in State 3, the operator 150 has relinquished his or her selection of cameras for focused viewing and there are no more specifically active or passive cameras. Moreover, it is possible for action to be caught by any of the cameras while the video summaries are being presented in the display window 1415. As such, the operator 150 may miss out on live action while catching up on earlier summaries. Accordingly, various embodiments are possible to allow the operator 150 to catch up on old video without missing out on ongoing activity.

In a first embodiment, the display window 1415 is split while the security application is in State 3. For example, rather than occupy the entire display window 1415, the video summaries being played back may occupy a first section of the display window 1415 (e.g., sub-windows 1440, 1450), with live feeds from the various cameras in the region of interest being shown in a second section of the display window 1415 (e.g., sub-windows 1420, 1430). The security application may implement a first management algorithm 1480 to manage the display of video summaries in the first section and a second management algorithm 1460 to manage the display of live video data in the second section. The two management algorithms 1460, 1480 may be interlinked so as to allow flexibility of control over the various sub-windows. This allows the operator 150 to view some live video data and some video summaries simultaneously. This may be advantageous in the case where the video summaries take some time to play out, and during this time while the operator 150 is "catching up" using the first section (sub-windows 1440, 1450), he or she continues to monitor some live camera feeds in the second section (sub-windows 1410, 1420), thereby allowing the operator 150 to witness live action that may require the operator's further attention.

In a second embodiment, playback of the previously created video summaries occupies the entire display window 1415, but in the background, video summaries are being created from ongoing live action caught by the various cameras in the region of interest 1408. The newly created video summaries (i.e., those created during playback of the previously displayed video summaries) are added to the list of video summaries that needs to be presented in the display window 1415.

As such, the security application in State 3 ("catch-up") allows the operator 150 to catch up with what he or she missed, in faster-than-real-time. At some point, the video summaries will catch up with the present time. Once this occurs, or at any other time based on manual input from the operator 150, the security application can transition from State 3 ("catch up") back to State 1 ("live").

The above example use case has been described in order to illustrate certain basic concepts of video summary management in the context of a security application. Of course, other variants exist in order to accommodate more sophisticated usage patterns, such as where the operator wishes to vary the region of interest (and hence the cameras associated therewith) or zoom into a different sub-region of the region of interest before the security application has transitioned from State 3 back to State 1, etc. However, it is expected that those of skill in the art will be able to apply the teachings herein to develop a suitable mechanism for managing video summaries to meet operational goals.

Figure 6:
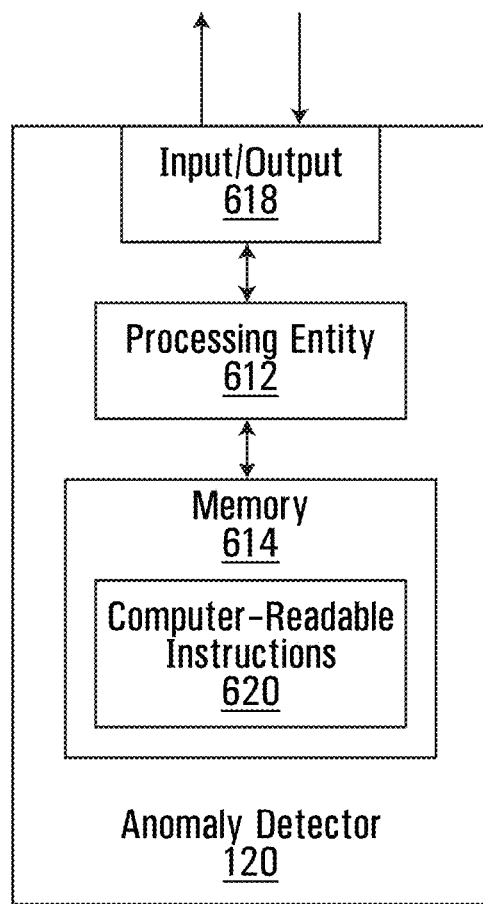
FIG. 6 is a block diagram of an anomaly detector, in accordance with a non-limiting embodiment.

Various operational embodiments are provided herein, including embodiments in which one or more of the operations described may correspond to computer readable instructions stored on one or more computer readable media, which if executed by a computing device, will configure the computing device to perform the operations described. Accordingly, and with reference to FIG. 6, such a computing device 610 may include a processing entity 612 and a memory 614 that stores computer-readable instructions 620. The memory 614 may be implemented in a variety of ways, such as a magnetic disk, or solid state memory, and may include flash memory, SRAM, DRAM, phase-change memory and the like. The processing entity 612 is configured to execute the computer-readable instructions in the memory 614. In doing so, the processing entity 612 of the computing device 610 causes the computing device 610 to implement a graphics pipeline. Examples of a processing entity may include electronic components such as a computer processor on a microchip. The graphics pipeline may be encoded as a subset 616 of the computer-readable instructions 620 in the memory 614. An input/output (I/O) 618 enables the processing entity 612 to communicate externally and may include a screen (e.g., touchscreen), keyboard/mouse, network interface device/card (e.g., to support NFC, WiFi, Ethernet or cellular/GSM/LTE communications), USB port(s), etc.

Components of the computing device 610, such as the processing entity 612 and the memory 614 and various other input and other output devices, may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of the computing device 610 may be interconnected by a network. For example, the memory 614 may be comprised of multiple physical memory units located in different physical locations interconnected by a network. Moreover, depending on the exact device configuration and type, the memory 614 may be volatile (such as RAM, for example), non-volatile (such as ROM, flash memory, etc., for example) or some combination of the two. The computer readable instructions stored in the memory 614 may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Furthermore, the order in which some or all of the operations are described should not be construed as to imply that these operations are necessarily order-dependent. Alternative ordering will be appreciated by one skilled in the art having the benefit of this description. Further, it is possible that not all operations described in the context of one embodiment are necessary to permit operation of that embodiment.

It should also be appreciated that the aforementioned disclosure exposes various problems, the solution to which requires a computer.

Finally, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A computer-implemented media processing method, comprising:
   obtaining at least one video stream;
   determining an anomaly state of each of a plurality of time windows of each of the at least one video stream by:
      obtaining motion indicators for a plurality of samples of the video stream, each of the time windows spanning a subset of the samples; and
      obtaining an anomaly state for a given time window of the plurality of time windows by:
         obtaining estimated statistical parameters for the given time window based on measured statistical parameters characterizing the motion indicators for the samples in at least one time window of the video stream that precedes the given time window; and
         determining the anomaly state for the given time window based on the plurality of motion indicators obtained for the samples in the given time window and the estimated statistical parameters;
   identifying segments of interest of each of the at least one video stream based on the anomaly states of the time windows of each of the at least one video stream; and
   creating a media summary based on the identified segments of interest of the at least one video stream.

2. The method defined in claim 1, wherein the anomaly state of a given one of the time windows indicates whether the given one of the time windows exhibits a statistically abnormal change in motion.

3. The method defined in claim 1, wherein the at least one video stream comprises a plurality of video streams containing video data and received from a plurality of cameras and wherein the media summary comprises video data from at least two cameras in the plurality of cameras.

4. The method defined in claim 2, wherein identifying segments of interest of each of the at least one video stream based on the anomaly states of the time windows of each of the at least one video stream comprises identifying those time windows of the at least one video stream whose anomaly state is indicative of a statistically abnormal change in motion.

5. The method defined in claim 2, wherein identifying segments of interest of each of the at least one video stream based on the anomaly states of the time windows of each of the at least one video stream comprises identifying those time windows of the at least one video stream whose anomaly state is indicative of an anomaly state transition.

6. The method defined in claim 2, wherein identifying segments of interest of each of the at least one video stream based on the anomaly states of the time windows of each of the at least one video stream comprises identifying specific time windows of the at least one video stream whose anomaly state is indicative of an anomaly state transition, in addition to at least one time window preceding each of the specific time windows and at least one time window following each of the specific time windows.

7. The method defined in claim 2, wherein identifying segments of interest of each of the at least one video stream based on the anomaly states of the time windows of each of the at least one video stream comprises identifying those time windows of the at least one video stream whose anomaly state is indicative of a statistically abnormal increase in motion.

8. The method defined in claim 2, wherein identifying segments of interest of each of the at least one video stream based on the anomaly states of the time windows of each of the at least one video stream comprises identifying those time windows of the at least one video stream whose anomaly state matches user-specified criteria.

9. The method defined in claim 8, further comprising implementing a GUI to obtain from a user the user-specified criteria.

10. The method defined in claim 9, wherein the user-specified criteria comprise at least an anomaly state of interest specified by the user.

11. The method defined in claim 10, wherein the user-specified criteria further comprise at least an anomaly state transition of interest within the same video stream.

12. The method defined in claim 11, wherein the user-specified criteria further comprise a desired time range for the at least one video stream.

13. The method defined in claim 1, wherein creating a media summary based on the identified segments of interest of the at least one video stream comprises concatenating the identified segments of interest of the at least one video stream.

14. The method defined in claim 1, wherein creating a media summary based on the identified segments of interest of the at least one video stream comprises combining the identified segments of interest of the at least one video stream with an identifier of the video stream associated with each of the segments of interest.

15. The method defined in claim 1, wherein the method further comprising receiving at least one anomaly state output stream conveying the anomaly states of the time windows of each of the at least one video stream.

16. The method defined in claim 2, wherein the method further comprising receiving at least one anomaly state output stream conveying an anomaly state for each time window of the at least one video stream.

17. The method defined in claim 1, further comprising storing the media summary in memory.

18. The method defined in claim 1, wherein the media summary is a video summary, the method further comprising playing back the video summary on a display.

19. The method defined in claim 1, the method further comprising simultaneously playing back the video summary and the at least one video stream from which the video summary was created on a display.

20. The method defined in claim 1, wherein the at least one video stream comprises a plurality of video streams, and wherein the media summary comprises a video summary including interleaved segments of interest from the plurality of video streams.

21. The method defined in claim 1, wherein the at least one video stream comprises a plurality of video streams, and wherein the media summary comprises segments of interest containing video data and a header associated with each segment of interest and identifying a source of the associated segment of interest.

22. The method defined in claim 21, wherein the header associated with each segment of interest further identifies a time stamp of the associated segment of interest.

23. The method defined in claim 1, wherein creating the media summary based on the identified segments of interest comprises determining a time stamp data for each of the segments of interest, the media summary comprising the determined time stamp data.

24. A computer-implemented media processing method, comprising:
  obtaining an original media stream;
  for each given time window of a plurality of time windows of the original media stream, determining an anomaly state associated with the given time window, the anomaly state being one of a plurality of possible anomaly states; and
  storing a composite media stream in a memory, each of a plurality of time windows of the composite media stream comprising a corresponding one of the plurality of time windows of the original media stream and an indication of the anomaly state associated with the corresponding one of the plurality of time windows of the original media stream, wherein the anomaly state associated with the corresponding one of the plurality of time windows of the original media stream is based on (i) an estimate of statistical parameters about a normal motion level for the original media stream; (ii) instantaneous measures of a current motion level; and (iii) utilizing statistical hypothesis testing to determine if the current motion level is statistically normal or abnormal.

25. The method defined in claim 24, wherein the plurality of possible anomaly states includes at least one anomaly state indicative of an anomalous increase in motion, at least one anomaly state indicative of an anomalous decrease in motion and an anomaly state indicative of neither an anomalous increase in motion nor an anomalous decrease in motion.

26. The method defined in claim 25, wherein an anomalous increase in motion comprises a statistically abnormal increase in motion and wherein an anomalous decrease in motion comprises a statistically abnormal decrease in motion.

27. The method defined in claim 24, wherein the original media stream is a video stream.

28. The method defined in claim 24, wherein the original media stream comprises a video stream and wherein determining an anomaly state associated with the given time window comprises:
  obtaining motion indicators for a plurality of samples of the video stream, each of the time windows spanning a subset of the samples;
  obtaining an anomaly state for a given time window of the plurality of time windows by:

obtaining estimated statistical parameters for the given time window based on measured statistical parameters characterizing the motion indicators for the samples in at least one time window of the video stream that precedes the given time window; and determining the anomaly state for the given time window based on the plurality of motion indicators obtained for the samples in the given time window and the estimated statistical parameters.

29. The method defined in claim 24, wherein the original media stream is a video stream originating from a particular camera, and wherein the composite media stream is stored in the memory in association with an identifier of the particular camera.

30. A computer-implemented media processing method, comprising:
in an original state, displaying a map and a display window, the map corresponding to locations of a plurality of cameras and the display window displaying video feeds corresponding to video data sent by the cameras;
in response to a selection of a subset of said plurality of cameras, referred to as active cameras, displaying on the display window video feeds corresponding to video data sent by the active cameras, and creating summaries of the video data sent by the cameras in the plurality of cameras that are not the active cameras, referred to as passive cameras,
in response to a request to return to the original state, playing back on the display window the summaries to catch up to present time; and
returning to the original state after the summaries have caught up to present time.

31. The computer-implemented method defined in claim 30, wherein the display window and the map share a display screen.

32. The computer-implemented method defined in claim 30, further comprising providing an interactive display to enable a user to input the selection of the subset of said plurality of cameras by manipulating the map.

33. The computer-implemented method defined in claim 30, further comprising providing an interactive display to enable a user to input the selection of the subset of said plurality of cameras by zooming into the map and to enable the user to request a return to the original state by zooming out of the map.

34. The computer-implemented method defined in claim 30, wherein creating summaries of the video data sent by the passive cameras comprises keeping only those portions of the video data associated with an anomalous motion.

35. The computer-implemented method defined in claim 30, wherein creating summaries of the video data sent by the passive cameras comprises keeping only those portions of the video data associated with a transition from statistically normal motion to a statistically abnormal motion.

36. A system, comprising:
an input for receiving a video stream;
an output for releasing an output stream; and
a processor for producing the output stream from the video stream;
wherein the processor is configured such that when the video stream is characterized by a first sequence of oscillating frames having a % motion change of M from one frame to the next for a non-zero value of M that is less than 100%, the output stream is characterized by a first change in output value that lasts for a certain number of oscillating frames in the video stream followed by a second change in output value to a second value, which from that point on ceases to change even while the video stream continues to include the first sequence of oscillating frames.

37. The system defined in claim 36, wherein the processor is further configured such that when the video stream is characterized by a second sequence of oscillating frames having a 100% motion change from one frame to the next, the output stream is characterized by a third change in output value that lasts for a certain number of oscillating frames in the video stream followed by a fourth change in output value back to the second value, which from that point on ceases to change even while the video stream continues to include the second sequence of oscillating frames.

38. The method defined in claim 24, further comprising monitoring statistics about the time windows of the original media stream associated with each of the anomaly states.

39. The method defined in claim 24, further comprising monitoring the absolute or relative number of time windows of the original media stream associated with each of the anomaly states.

40. A non-transitory computer readable medium storing having instructions tangibly stored thereon, wherein the instructions, when executed, cause a system to:
obtain at least one video stream;
determine an anomaly state of each of a plurality of time windows of each of the at least one video stream by:
obtaining motion indicators for a plurality of samples of the video stream, each of the time windows spanning a subset of the samples; and
obtaining an anomaly state for a given time window of the plurality of time windows by:
obtaining estimated statistical parameters for the given time window based on measured statistical parameters characterizing the motion indicators for the samples in at least one time window of the video stream that precedes the given time window; and
determining the anomaly state for the given time window based on the plurality of motion indicators obtained for the samples in the given time window and the estimated statistical parameters;
identify segments of interest of each of the at least one video stream based on the anomaly states of the time windows of each of the at least one video stream; and
create a media summary based on the identified segments of interest of the at least one video stream.

41. A system comprising:
a non-transitory memory comprising instructions; and
one or more processors in communication with the memory, wherein the one or more processors execute the instructions to:
obtain at least one video stream;
determine an anomaly state of each of a plurality of time windows of each of the at least one video stream by:
obtaining motion indicators for a plurality of samples of the video stream, each of the time windows spanning a subset of the samples; and
obtaining an anomaly state for a given time window of the plurality of time windows by:
obtaining estimated statistical parameters for the given time window based on measured statistical parameters characterizing the motion indicators for the samples in at least one time window of the video stream that precedes the given time window; and determining the anomaly state for the given time window based on the plurality of motion indicators obtained for the samples in the given time window and the estimated statistical parameters;

identify segments of interest of each of the at least one video stream based on the anomaly states of the time windows of each of the at least one video stream; and create a media summary based on the identified segments of interest of the at least one video stream.

42. A non-transitory computer readable medium storing having instructions tangibly stored thereon, wherein the instructions, when executed, cause a system to:

obtain an original media stream;

for each given time window of a plurality of time windows of the original media stream, determine an anomaly state associated with the given time window, the anomaly state being one of a plurality of possible anomaly states; and store a composite media stream in a memory, each of a plurality of time windows of the composite media stream comprising a corresponding one of the plurality of time windows of the original media stream and an indication of the anomaly state associated with the corresponding one of the plurality of time windows of the original media stream, wherein the anomaly state associated with the corresponding one of the plurality of time windows of the original media stream is based on (i) an estimate of statistical parameters about a normal motion level for the original media stream; (ii) instantaneous measures of a current motion level; and (iii) utilizing statistical hypothesis testing to determine if the current motion level is statistically normal or abnormal.

43. A system comprising:

a non-transitory memory comprising instructions; and one or more processors in communication with the memory, wherein the one or more processors execute the instructions to:

obtain an original media stream;

for each given time window of a plurality of time windows of the original media stream, determine an anomaly state associated with the given time window, the anomaly state being one of a plurality of possible anomaly states; and store a composite media stream in a memory, each of a plurality of time windows of the composite media stream comprising a corresponding one of the plurality of time windows of the original media stream and an indication of the anomaly state associated with the corresponding one of the plurality of time windows of the original media stream, wherein the anomaly state associated with the corresponding one of the plurality of time windows of the original media stream is based on (i) an estimate of statistical parameters about a normal motion level for the original media stream; (ii) instantaneous measures of a current motion level; and (iii) utilizing statistical hypothesis testing to determine if the current motion level is statistically normal or abnormal.

44. The computer-implemented method defined in claim 30, wherein the summaries are previously created video summaries, the method further comprising: while playing back the previously created video summaries on the display, creating new video summaries for ongoing video feeds captured by one or more of the passive cameras.

45. The computer-implemented method defined in claim 30, further comprising: while playing back a video summary from a given camera on the display window, further comprising displaying a time bar to show a playback time corresponding to the video summary.

46. The computer-implemented method defined in claim 45, further comprising displaying an emphasized icon corresponding to a geographic location of the given camera on the map.

47. The computer-implemented method defined in claim 45, wherein the playback time may be a time with reference to the present time.

48. The computer-implemented method defined in claim 30, further comprising: during playback of the video summaries on the display window, displaying on the display window video feeds in a region of interest of the map.

49. The computer-implemented method defined in claim 30, further providing an interactive element to enable a user to specify in detail criteria needed to be met by the video data to appear in a video summary.

50. The system defined in claim 36, wherein the first sequence of oscillating frames is alternating between a first set of pixel values and a second set of pixel values.

51. The system defined in claim 36, wherein the video stream is a test video stream.

52. The system defined in claim 36, wherein the video stream is a raw video stream or a moving picture experts group (MPEG) video stream.

53. The system defined in claim 36, wherein the output stream indicates an ability of the system to perform statistical anomalous motion detection.

54. The system defined in claim 36, wherein the system is a statistical motion level detector.

55. The system defined in claim 36, wherein the system is a device under test (DUT).

56. The system defined in claim 36, wherein the output stream indicates that the system is configured to detect abnormal changes in motion.

57. The system defined in claim 36, wherein M is user-definable.

58. The system defined in claim 37, wherein the second sequence of oscillating frames is alternating between a third set of pixel values and a fourth set of pixel values.

* * * * *